United States Patent
Shimizu et al.

(10) Patent No.: US 10,841,501 B2
(45) Date of Patent: Nov. 17, 2020

(54) PHOTOGRAPHING CONTROL APPARATUS AND PHOTOGRAPHING CONTROL METHOD

(71) Applicant: FUJITSU LIMITED, Kawasaki (JP)

(72) Inventors: Masayoshi Shimizu, Hadano (JP);
Taku Fukui, Fukuoka (JP);
Shinichirou Miyajima, Onojo (JP);
Moyuri Nakashima, Fukuoka (JP);
Tomohiko Izutsu, Nagasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/374,036

(22) Filed: Apr. 3, 2019

(65) Prior Publication Data

US 2019/0230292 A1   Jul. 25, 2019

Related U.S. Application Data

(63) Continuation of application No. 15/491,195, filed on Apr. 19, 2017, now abandoned.

(30) Foreign Application Priority Data

May 23, 2016   (JP) ................................. 2016-102585

(51) Int. Cl.
  *H04N 5/232*   (2006.01)
  *G06K 9/00*   (2006.01)
  (Continued)

(52) U.S. Cl.
  CPC ....... *H04N 5/23296* (2013.01); *G06K 9/0061* (2013.01); *G06K 9/00335* (2013.01);
  (Continued)

(58) Field of Classification Search
  None
  See application file for complete search history.

(56) References Cited

U.S. PATENT DOCUMENTS

| | | | |
|---|---|---|---|
| 2011/0090341 A1 | 4/2011 | Ikewada et al. | |
| 2012/0002063 A1* | 1/2012 | Lee | H04N 5/23219 348/211.2 |

(Continued)

FOREIGN PATENT DOCUMENTS

| | | |
|---|---|---|
| JP | 2002-359766 | 12/2002 |
| JP | 2004-266404 | 9/2004 |

(Continued)

OTHER PUBLICATIONS

USPTO, (Chin) Non-Final Rejection, dated Dec. 13, 2018, in parent U.S. Appl. No. 15/491,195 [pending].

(Continued)

*Primary Examiner* — Ricky Chin
(74) *Attorney, Agent, or Firm* — Fujitsu Patent Center

(57) ABSTRACT

A photographing control apparatus includes a memory configured to store a first image that is photographed by a first camera and the second image that is photographed by a second camera the second image including an image of a user who has visibility of the first image being displayed in a display, and a processor coupled to the memory and configured to acquire the first image and the second image, detect the line of sight of the user based on the second image, identify an object displayed at the position of the line of sight of the user from the first image displayed in the display, and control a photographing direction or photographing magnification of the first camera or both photographing direction and photographing magnification of the first camera so that the object is continuously included in the first image for a predetermined time period or longer.

12 Claims, 18 Drawing Sheets

(51) Int. Cl.
*G06K 9/32* (2006.01)
*H04N 5/225* (2006.01)
*H04N 13/239* (2018.01)
*H04N 13/25* (2018.01)
*H04N 7/18* (2006.01)

(52) U.S. Cl.
CPC ....... *G06K 9/00771* (2013.01); *G06K 9/3216* (2013.01); *H04N 5/2258* (2013.01); *H04N 5/23219* (2013.01); *H04N 5/23229* (2013.01); *H04N 5/23293* (2013.01); *H04N 7/181* (2013.01); *H04N 13/239* (2018.05); *H04N 13/25* (2018.05)

(56) References Cited

U.S. PATENT DOCUMENTS

| | | | | |
|---|---|---|---|---|
| 2013/0207895 | A1* | 8/2013 | Lee | G06F 3/012 345/158 |
| 2014/0341425 | A1* | 11/2014 | Babacan | G06K 9/00228 382/103 |
| 2015/0320296 | A1* | 11/2015 | Morita | G06T 7/0012 348/65 |
| 2016/0364012 | A1* | 12/2016 | Govezensky | G06F 3/0304 |
| 2017/0280045 | A1 | 9/2017 | Nonaka | |
| 2017/0318019 | A1* | 11/2017 | Gordon | G06K 9/00617 |

FOREIGN PATENT DOCUMENTS

| | | |
|---|---|---|
| JP | 2008-85874 | 4/2008 |
| JP | 2008-219452 | 9/2008 |
| JP | 2009-147607 | 7/2009 |
| JP | 2009-237993 | 10/2009 |
| JP | 2011-091546 | 5/2011 |
| JP | 2012-118188 | 6/2012 |
| JP | 2014-95953 | 5/2014 |
| WO | 2016/068057 | 5/2016 |

OTHER PUBLICATIONS

USPTO, (Asanbayev) Restriction Requirement, in parent U.S. Appl. No. 15/491,195 [pending].
JPOA—Office Action of Japanese Patent Application No. 2016-102585 dated Nov. 12, 2019 with Full Machine Translation.

* cited by examiner

DISPLAY SWITCHING OF IMAGES PHOTOGRAPHED
BY MONITORING CAMERAS x AND y

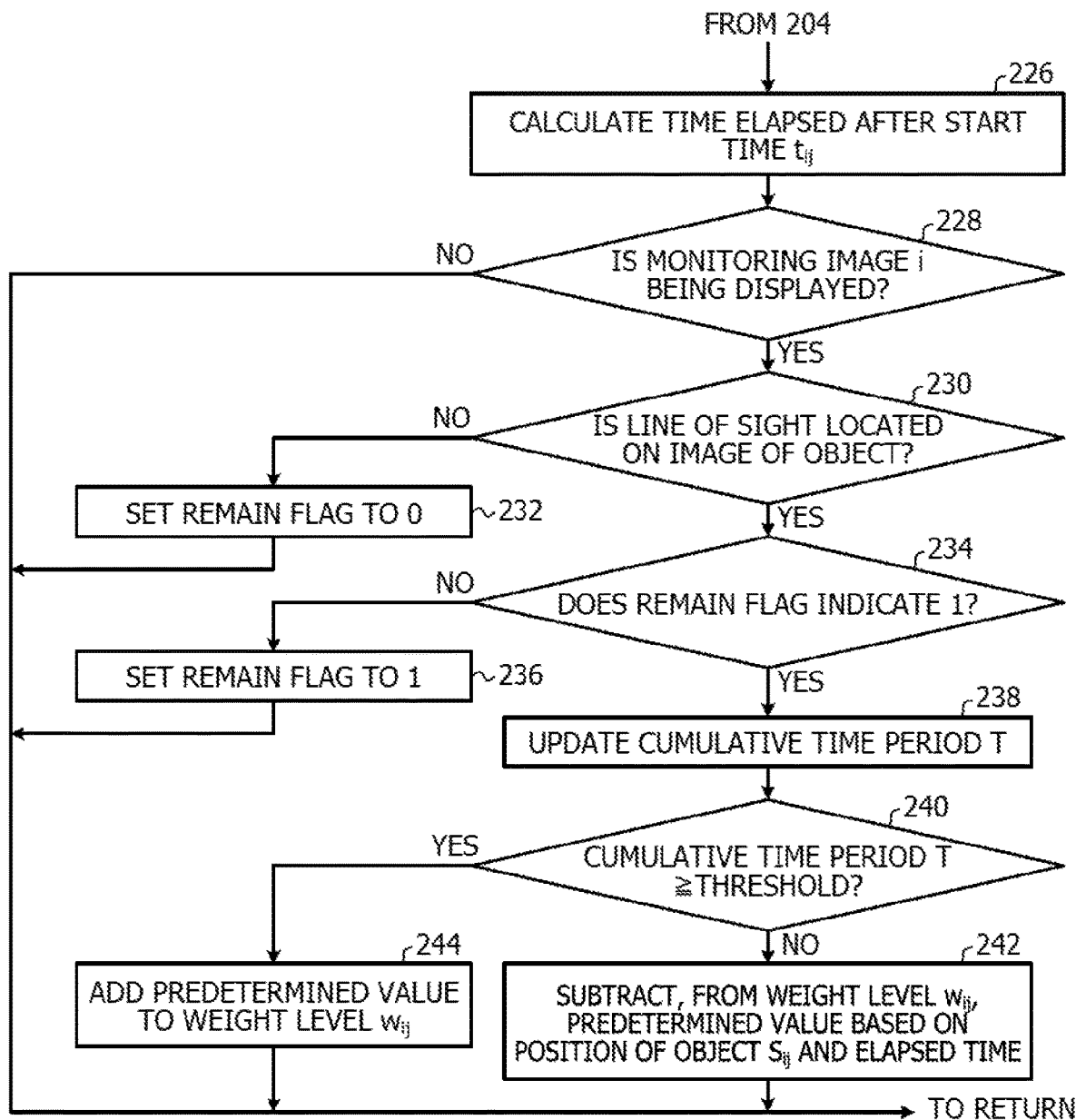

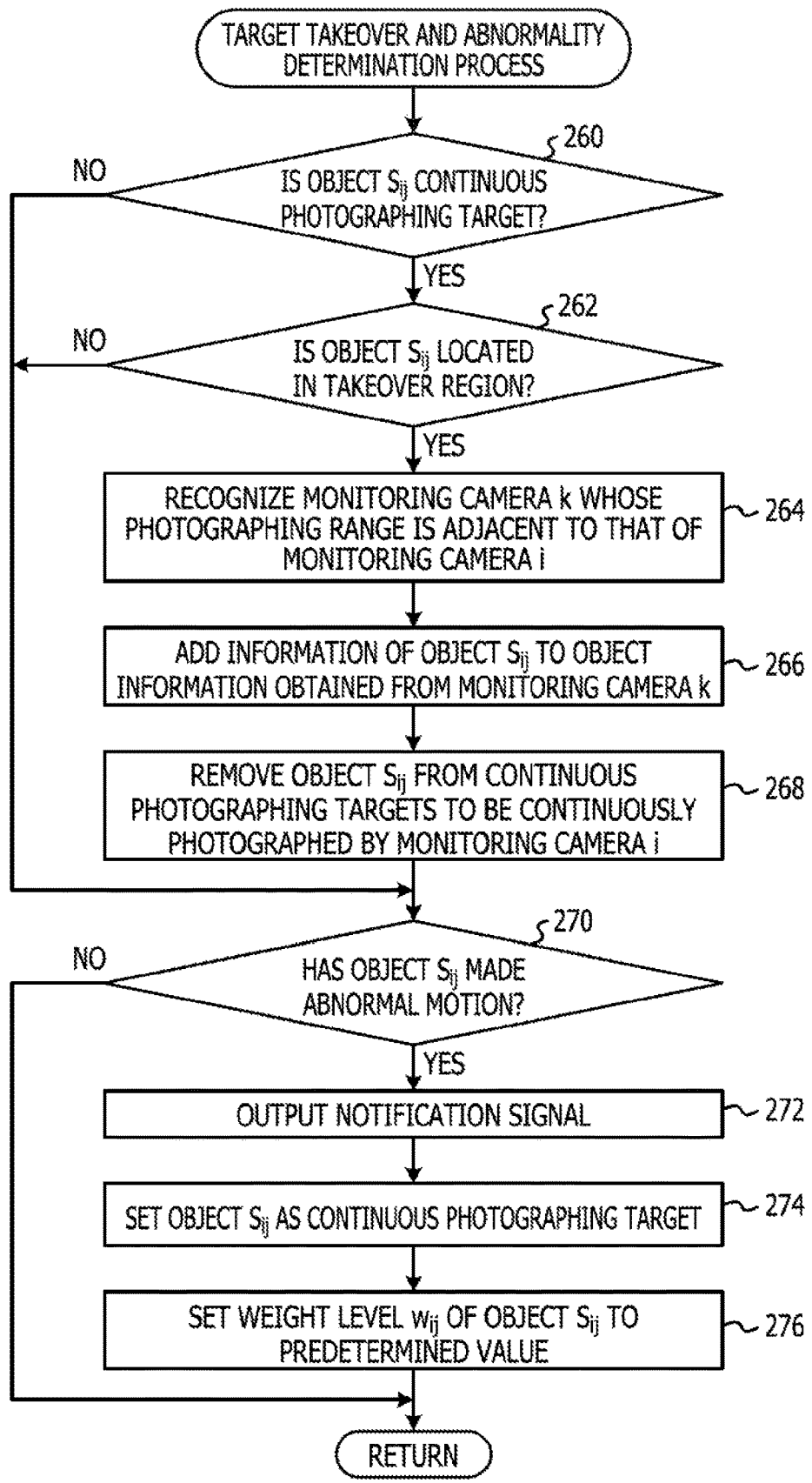

FIG. 7

| CAMERA | DISPLAY TARGET | OBJECT ID | CHARACTERISTIC AMOUNT INFORMATION | POSITIONAL COORDINATES | IMAGE RANGE | CONTINUOUS PHOTOGRAPHING TARGET FLAG | WEIGHT LEVEL FLAG | REGISTERED PERSON FLAG | START TIME OF CONTINUOUS PHOTOGRAPHING | CUMULATIVE TIME PERIOD | LINE-OF-SIGHT REMAIN FLAG | ... |
|---|---|---|---|---|---|---|---|---|---|---|---|---|
| MONITORING CAMERA 1 | ON | $S_{11}$ | $X_{11}$ | $P_{11}$ | x,y TO x,y | ON | $W_{11}$ | OFF | $t_{11}$ | $T_{11}$ | ON | ... |
| | | ... | ... | ... | ... | ... | ... | ... | ... | ... | ... | ... |
| | | $S_{1j}$ | $X_{1j}$ | $P_{1j}$ | x,y TO x,y | OFF | $W_{1j}$ | OFF | — | $T_{1j}$ | OFF | ... |
| MONITORING CAMERA 2 | OFF | $S_{21}$ | $X_{21}$ | $P_{21}$ | x,y TO x,y | ON | $W_{21}$ | ON | $t_{21}$ | $T_{21}$ | OFF | ... |
| | | ... | ... | ... | ... | ... | ... | ... | ... | ... | ... | ... |
| | | $S_{2j}$ | $X_{2j}$ | $P_{2j}$ | x,y TO x,y | OFF | $W_{2j}$ | OFF | — | $T_{2j}$ | OFF | ... |
| ... | | ... | ... | ... | ... | ... | ... | ... | ... | ... | ... | ... |

34

PHOTOGRAPHING CONTROL APPARATUS AND PHOTOGRAPHING CONTROL METHOD

CROSS-REFERENCE TO RELATED APPLICATION

This application is a continuation of application Ser. No. 15/491,195, filed Apr. 19, 2017, based upon and claims the benefit of priority of the prior Japanese Patent Application No. 2016-102585, filed on May 23, 2016, the entire contents of which are incorporated herein by reference.

FIELD

The embodiment discussed herein is related to a photographing control apparatus and a photographing control method.

BACKGROUND

The following technique has been proposed: when an operational button is pressed, the visual field direction of a camera is automatically controlled so that an object displayed at the position of an operation marker superimposed and displayed on an image photographed by the camera is located at the center of the visual field of the camera. In this technique, a predetermined region whose center is located at the position of the operational marker when the operational button is pressed is registered as a template image, and a portion that is included in the photographed image and has the highest similarity to the template image is automatically traced by the camera until the portion is located at the center of the image.

An example of related art is Japanese Laid-open Patent Publication No. 2002-359766.

SUMMARY

According to an aspect of the invention, a photographing control apparatus includes a memory configured to store a first image that is photographed by a first camera and the second image that is photographed by a second camera the second image including an image of a user who has visibility of the first image being displayed in a display, and a processor coupled to the memory and configured to acquire the first image and the second image, detect the line of sight of the user based on the second image, identify an object displayed at the position of the line of sight of the user from the first image displayed in the display, and control a photographing direction or photographing magnification of the first camera or both photographing direction and photographing magnification of the first camera so that the object is continuously included in the first image for a predetermined time period or longer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5B is a flowchart of an example of a continuous photographing target identification process;

FIG. 6 is a flowchart of an example of a target takeover and abnormality determination process;

FIG. 7 is a diagram illustrating an example of object information;

DESCRIPTION OF EMBODIMENT

For example, in a facility in which care such as nursing care or child care is provided, a caregiver is responsible for the care of multiple persons to be cared in general, and during the time when the caregiver helps a certain person to be cared, the caregiver may temporarily pay insufficient attention to the other persons. It is therefore considered that the persons who are to be cared and to which insufficient attention is temporarily paid by the caregiver are watched by displaying a monitoring image photographed by a monitoring camera and indicating a care site in a display within another room and visually checking the monitoring image by a user such as administrative staff of the facility. However, since the user such as the administrative staff of the facility is responsible for the task of visual checking the monitoring image and a task other than the visual checking, it is requested that the additional task of visually checking the monitoring image and watching the persons to be cared, for example, a task of controlling the monitoring camera to trace a target person, be reduced as much as possible.

When the aforementioned technique is applied and a user performs a task of temporarily specifying a person to be cared and watched on the monitoring image, the specified person to be cared is automatically traced by the monitoring camera. In this case, however, since the monitoring camera is controlled, the task of specifying the person to be cared and watched on the monitoring image by the user is not omitted. In the care site, a situation may frequently change, a person to be cared and watched may be switched, or multiple persons to be cared may be to be watched simultaneously. It is, therefore, desirable to reduce the burden on the user who visually checks the monitoring image.

According to an aspect, an object of the present disclosure is to provide a technique for controlling a camera configured to photograph a monitoring image in which a target to be monitored is included in a photographing region.

Figure 1:
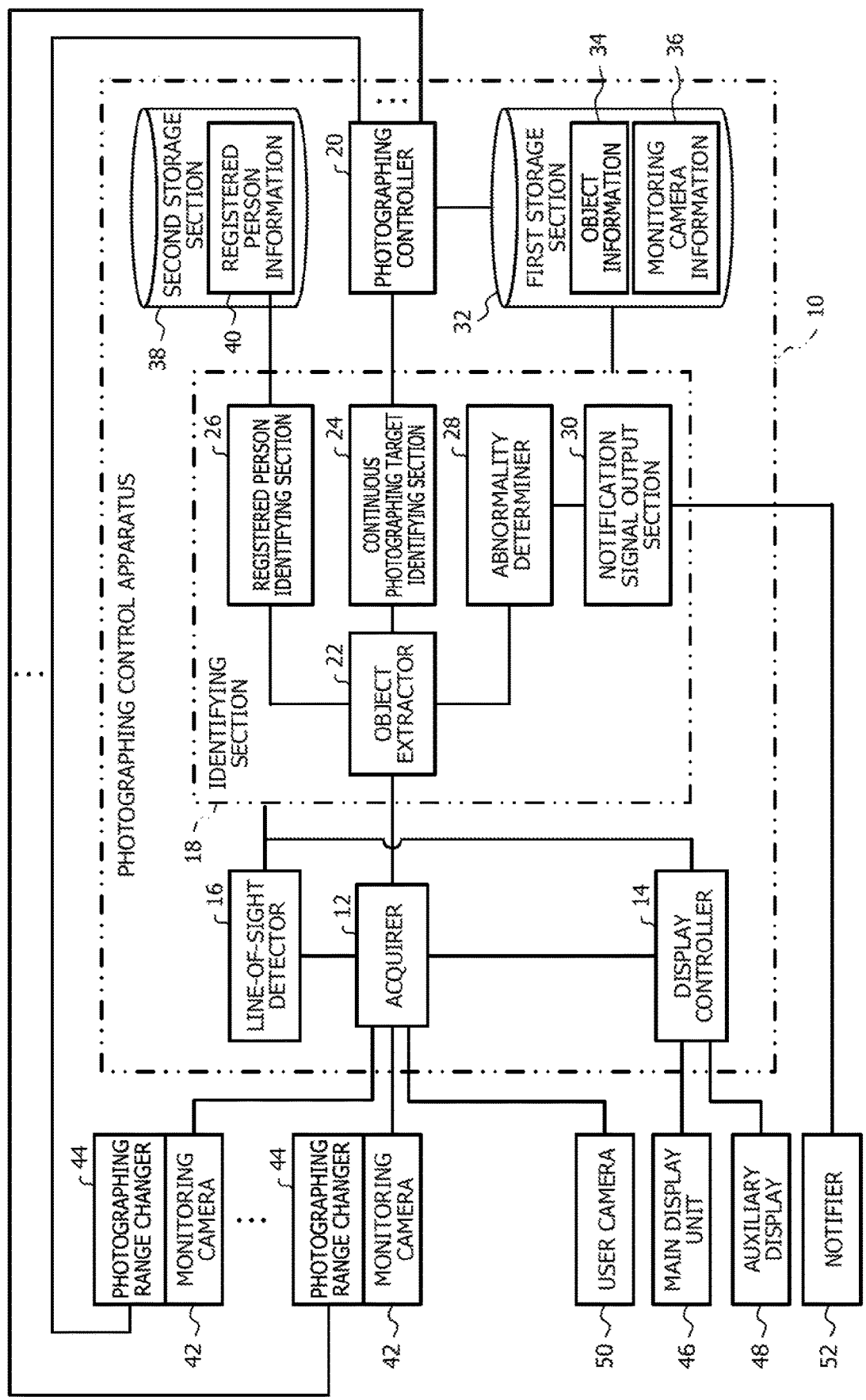
FIG. 1 is a functional block diagram of a photographing control apparatus.

Hereinafter, an embodiment of the technique disclosed herein is described in detail with reference to the accompanying drawings. FIG. 1 illustrates a photographing control apparatus 10. The photographing control apparatus 10 is connected to multiple monitoring cameras 42 that are installed at different locations in a care site of a care facility in which care such as nursing care or child care is provided and are configured to photograph the care site and output monitoring images. Photographing range changers 44 configured to change photographing ranges of the monitoring cameras 42 by driving forces such as motors are attached to the monitoring cameras 42 and connected to the photographing control apparatus 10.

The embodiment describes a case where the photographing range changers 44 change the photographing ranges of the corresponding monitoring cameras 42 by changing photographing directions of the corresponding monitoring cameras 42. The photographing control apparatus 10 controls the photographing ranges of the monitoring cameras 42 by outputting, to the corresponding photographing range changers 44, a control signal for controlling the photographing directions of the monitoring cameras 42.

In addition, a main display 46, an auxiliary display 48, a user camera 50, and a notifier 52 are connected to the photographing control apparatus 10 and installed in, for example, a room that is different from the care site and is located in the care facility and in which a user such as administrative staff of the care facility performs a task, for example. The photographing control apparatus 10 causes multiple monitoring images photographed by the multiple monitoring cameras 42 to be displayed in the main display 46 and the auxiliary display 48.

Normally, each of the monitoring images includes one or more persons to be cared as objects. During a task for which the user is responsible, the user visually checks a monitoring image displayed in the main display 46 or the auxiliary display 48 and confirms whether or not a person who is to be cared and to which insufficient attention is temporarily paid by a caregiver exists. If the person who is to be cared and to which insufficient attention is temporarily paid by the caregiver exists, the user watches the person to be cared on the monitoring image and performs a care support task or contacts the caregiver or the like.

The user camera 50 photographs the user visually checking the monitoring image displayed in the main display 46 or the auxiliary display 48 and outputs a user image. The user camera 50 may be a visible light camera or an infrared light camera having an infrared light source. The notifier 52 includes a buzzer for notifying the user of the occurrence of an abnormality.

The photographing control apparatus 10 includes an acquirer 12, a display controller 14, a line-of-sight detector 16, an identifying section 18, a photographing controller 20, a first storage section 32, and a second storage section 38. The identifying section 18 includes an object extractor 22, a continuous photographing target identifying section 24, a registered person identifying section 26, an abnormality determiner 28, and a notification signal output section 30.

The acquirer 12 acquires the multiple monitoring images photographed by the multiple monitoring cameras 42 and the user image photographed by the user camera 50. The line-of-sight detector 16 detects the direction of the line of sight of the user based on the user image photographed by the user camera 50. The display controller 14 causes one of the multiple images photographed by the multiple monitoring cameras 42 to be displayed as a main monitoring image on an overall screen of the main display 46 and causes the remaining images to be displayed as thumbnail images in a matrix in the auxiliary display 48 (refer to FIG. 3A). In addition, the display controller 14 acquires the direction of the line of sight of the user from the line-of-sight detector 16 and switches the monitoring image displayed in the main display 46 to another monitoring image based on the direction of the line of sight of the user.

The identifying section 18 identifies, from objects included in the monitoring images photographed by the monitoring cameras 42, an object to be set as a continuous photographing target and continuously photographed for a predetermined time period or longer. Specifically, the object extractor 22 of the identifying section 18 extracts all the objects (persons) included in the monitoring images and causes the results of extracting the objects to be stored as object information 34 in the first storage section 32 for the monitoring cameras 42. Then, the continuous photographing target identifying section 24 identifies, from the objects extracted by the object extractor 22 from the monitoring images, the object displayed at the position of the line, detected by the line-of-sight detector 16, of sight of the user on the display screen of the main display 46 as the continuous photographing target.

The registered person identifying section 26 identifies, as a continuous photographing target from the objects extracted by the object extractor 22 from the monitoring images, an object having a characteristic stored as registered person information 40 in the second storage section 38. The abnormality determiner 28 determines whether or not each of the objects extracted by the object extractor 22 from the monitoring images has made an abnormal motion. The abnormality determiner 28 identifies, as a continuous photographing target, an object that has made an abnormal motion. If the abnormality determiner 28 detects an object that has made an abnormal motion, the notification signal output section 30 causes the notifier 52 to operate and output a notification signal for notifying the user of the abnormal motion.

The photographing controller 20 outputs a control signal for controlling a photographing range of a monitoring camera 42 to a photographing range changer 44 corresponding to the monitoring camera 42 so that the object identified by the identifying section 18 as the continuous photographing target is continuously photographed as a monitoring image for the predetermined time period or longer. The first storage section 32 has, stored therein, monitoring camera information 36 indicating positional relationships (for example, a positional relationship indicating that the photographing range of a monitoring camera y is adjacent to the photographing range of a monitoring camera x on the right side of the photographing range of the monitoring camera x and the like) between the photographing ranges of the monitoring cameras 42.

The acquirer 12 is an example of an acquirer included in the technique disclosed herein. The line-of-sight detector 16 is an example of a detector included in the technique disclosed herein. The identifying section 18 including the continuous photographing target identifying section 24 is an example of an identifying section included in the technique disclosed herein. The photographing controller 20 is an example of a controller included in the technique disclosed herein. The object extractor 22 is an example of an extractor included in the technique disclosed herein. The registered person identifying section 26 is an example of a registered person identifying section included in the technique disclosed herein. The abnormality determiner 28 is an example of an abnormality determiner included in the technique disclosed herein. The notification signal output section 30 is an example of a notification signal output section included in the technique disclosed herein.

Figure 2:
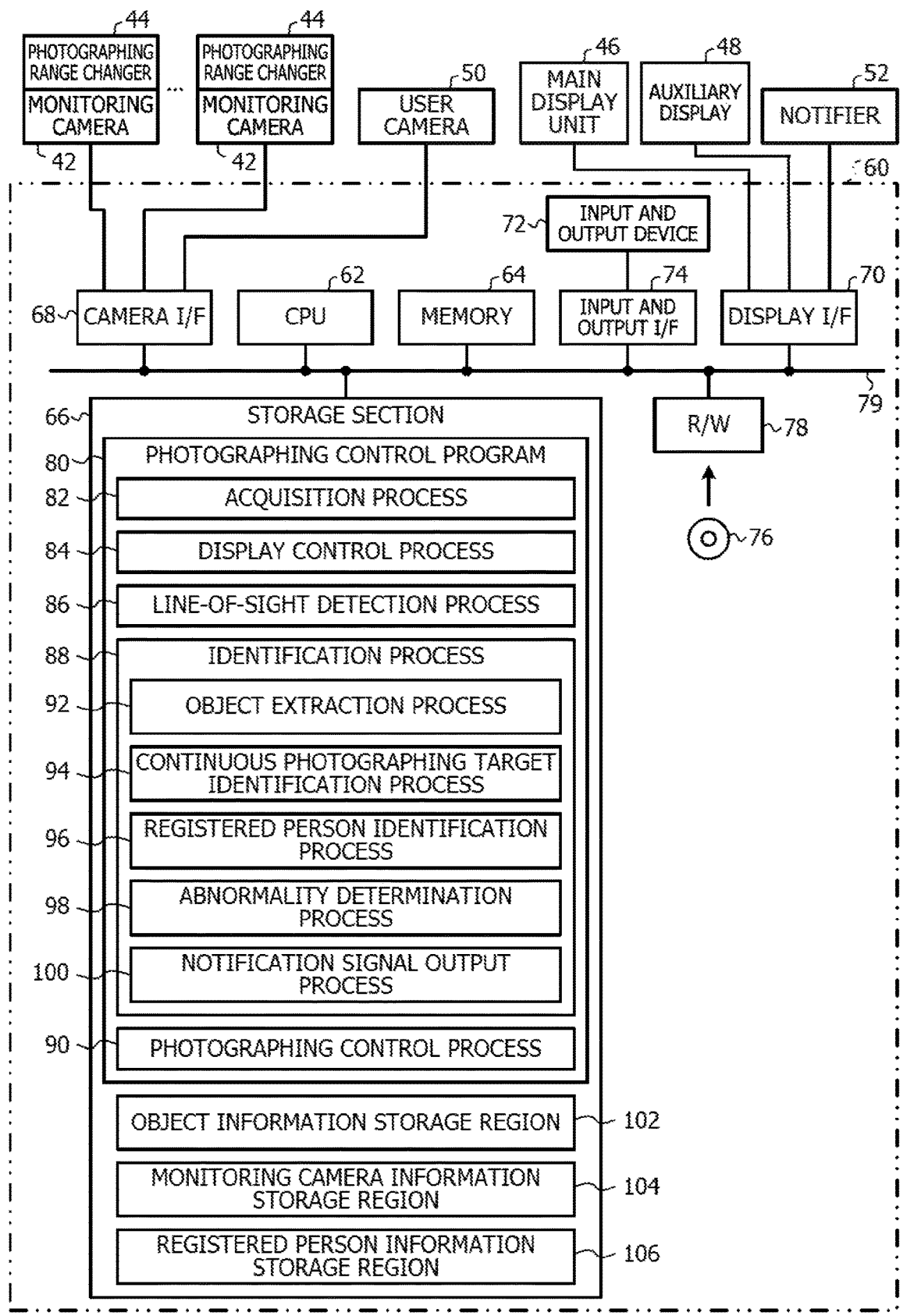
FIG. 2 is a schematic block diagram of a computer that functions as the photographing control apparatus.

The photographing control apparatus 10 may be achieved by a computer 60 illustrated in FIG. 2, for example. The computer 60 includes a CPU 62, a memory 64, and a nonvolatile storage section 66. The memory 64 serves as a temporal storage region. The computer 60 also includes a camera interface (I/F) 68 and a display I/F 70. The camera I/F 68 is connected to the user camera 50 and the monitoring cameras 42 including the photographing range changers 44. The display I/F 70 is connected to the main display 46, the auxiliary display 48, and the notifier 52. The computer 60 also includes an input and output I/F 74 and a reading and writing device (R/W) 78. The input and output I/F 74 is connected to an input and output device 72. The R/W 78 reads and writes data from and in a recording medium 76. The CPU 62, the memory 64, the storage section 66, the camera I/F 68, the display I/F 70, the input and output I/F 74, and the R/W 78 are connected to each other via a bus 79.

The storage section 66 is achieved by a hard disk drive (HDD), a solid state drive (SSD), a flash memory, or the like. In the storage section 66, a photographing control program 80 for causing the computer 60 to function as the photographing control apparatus 10 is stored. The CPU 62 reads the photographing control program 80 from the storage section 66, loads the read photographing control program 80 into the memory 64, and sequentially executes processes included in the photographing control program 80.

The photographing control program 80 includes an acquisition process 82, a display control process 84, a line-of-sight detection process 86, an identification process 88, and a photographing control process 90. The identification process 88 includes an object extraction process 92, a continuous photographing target identification process 94, a registered person identification process 96, an abnormality determination process 98, and a notification signal output process 100.

The CPU 62 executes the acquisition process 82, thereby operating as the acquirer 12 illustrated in FIG. 1. The CPU 62 executes the display control process 84, thereby operating as the display controller 14 illustrated in FIG. 1. The CPU 62 executes the line-of-sight detection process 86, thereby operating as the line-of-sight detector 16 illustrated in FIG. 1. The CPU 62 executes the identification process 88, thereby operating as the identifying section 18 illustrated in FIG. 1. The CPU 62 executes the photographing control process 90, thereby operating as the photographing controller 20 illustrated in FIG. 1.

The CPU 62 executes the object extraction process 92, thereby operating as the object extractor 22 illustrated in FIG. 1. The CPU 62 executes the continuous photographing target identification process 94, thereby operating as the continuous photographing target identifying section 24 illustrated in FIG. 1. The CPU 62 executes the registered person identification process 96, thereby operating as the registered person identifying section 26 illustrated in FIG. 1. The CPU 62 executes the abnormality determination process 98, thereby operating as the abnormality determiner 28 illustrated in FIG. 1. The CPU 62 executes the notification signal output process 100, thereby operating as the notification signal output section 30 illustrated in FIG. 1. Thus, the computer 60 executes the photographing control program 80, thereby functioning as the photographing control apparatus 10.

The storage section 66 has an object information storage region 102, a monitoring camera information storage region 104, and a registered person information storage region 106. In the object information storage region 102, the object information 34 is stored. In the monitoring camera information storage region 104, the monitoring camera information 36 is stored. In the registered person information region 106, the registered person information 40 is stored. Thus, the storage section 66 functions as the first storage section 32 and the second storage section 38 that are illustrated in FIG. 1.

The computer 60 may not be installed in the care facility and may be a server computer that is installed in a location other than the care facility and communicates with devices such as the monitoring cameras 42 installed in the care facility via a network. The photographing control apparatus 10 may be achieved by a semiconductor integrated circuit such as an application specific integrated circuit (ASIC), for example.

Figure 3A:
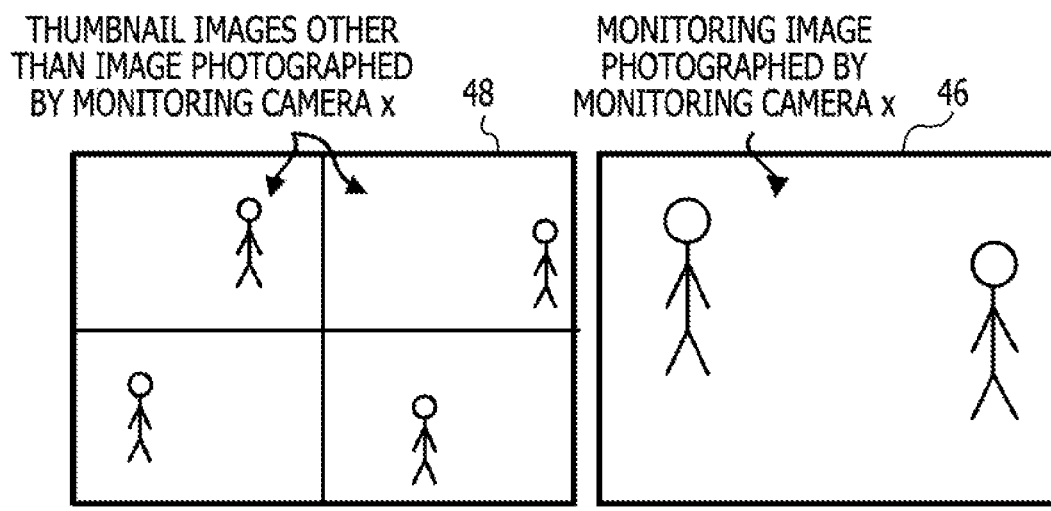
FIG. 3A is an image diagram describing a function of a display controller.

As an effect of the embodiment, the display controller 14 is described below. When a power supply of the photographing control apparatus 10 is turned on and multiple monitoring images are input to the photographing control apparatus 10 from the multiple monitoring cameras 42, the display controller 14 causes one of the monitoring images to be displayed on the overall screen of the main display 46 as an example, as illustrated in FIG. 3A. The monitoring image displayed in the main display 46 may be input from a predetermined monitoring camera 42 or may be displayed in the main display 46 immediately before the turning-off of the power supply of the photographing control apparatus 10. The display controller 14 causes the remaining monitoring images to be displayed as thumbnail images in a matrix in the auxiliary display 48, while the remaining monitoring images are among the multiple monitoring images and are not displayed in the main display 46.

The display controller 14 periodically acquires the direction, detected by the line-of-sight detector 16, of the line of sight of the user from the line-of-sight detector 16 and monitors whether or not the line of sight of the user remains in a specific thumbnail image displayed in the auxiliary display 48 for a predetermined time period or longer. If the display controller 14 detects that the line of sight of the user has remained in the specific thumbnail image for the predetermined time period or longer, the display controller 14 switches the main monitoring image displayed in the main display 46 to the specific image.

Figure 3B:
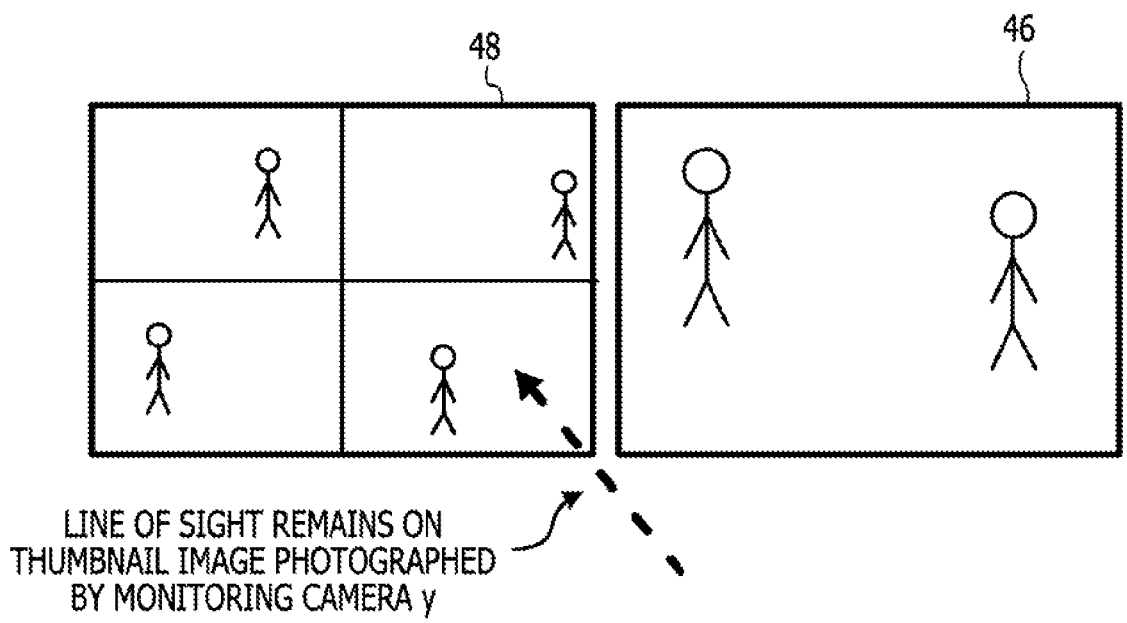
FIG. 3B is an image diagram describing the function of the display controller.
Figure 3C:
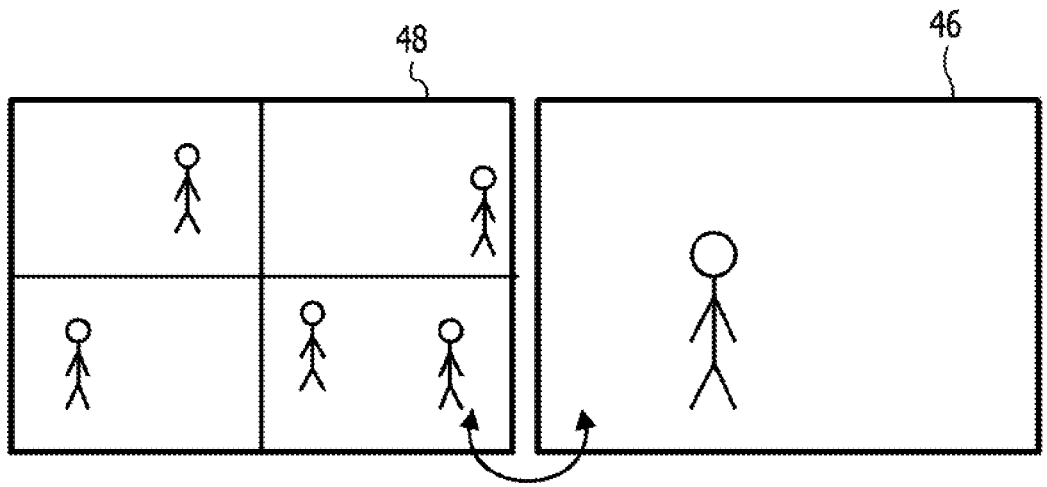
FIG. 3C is an image diagram describing the function of the display controller.

As an example, if the display controller 14 detects that the line of sight of the user remains on a thumbnail image photographed by the monitoring camera y for the predetermined time period or longer in a state in which a monitoring image photographed by the monitoring camera x is displayed in the main display 46 as illustrated in FIG. 3B, the display controller 14 switches the main monitoring image to the image photographed by the monitoring camera y as illustrated in FIG. 3C. Specifically, the monitoring image photographed by the monitoring camera y is displayed as a main monitoring image on the overall screen of the main display 46, and the monitoring image photographed by the monitoring camera x is displayed as a thumbnail image at a position at which the thumbnail image photographed by the monitoring camera y has previously been displayed on a display screen of the auxiliary display 48.

Thus, if an event that prompts the user to confirm a situation occurs in the photographing range of a monitoring camera 42 that has photographed an image displayed as a thumbnail image in the auxiliary display 48, and the user carefully watches the thumbnail image for the predetermined time period or longer, the thumbnail image is enlarged and displayed in the main display 46 due to the careful watching. Thus, the burden on the user who performs a task other than the care support task may be reduced.

The object information 34 stored in the first storage section 32 includes information (indicated as display target in FIG. 7) indicating whether or not each of monitoring images photographed by the monitoring cameras 42 is being displayed in the main display 46. The display controller 14 updates the aforementioned information included in the object information 34 every time a main monitoring image displayed in the main display 46 is switched.

Next, a photographing control process to be executed by the photographing control apparatus 10 when the power supply of the photographing control apparatus 10 is turned on and the CPU 62 executes the photographing control program 80 is described with reference to FIGS. 4 to 6.

In step 150 of the photographing control process, the object extractor 22 clears the object information storage region 102 of the storage section 66. In step 152, the acquirer 12 acquires the user image from the user camera 50. In step 154, the line-of-sight detector 16 extracts eye regions of the user from the user image acquired by the acquirer 12 and detects the direction of the line of sight of the user based on the extracted eye regions of the user.

The line of sight of the user may be detected by estimating the positions of the centers of eyeballs of the user from the eye regions of the user, calculating the positions of the centers of pupils of the user, and detecting the directions of straight lines extending through the positions of the centers of the eyeballs and the positions of the centers of the pupils, for example. If the user camera 50 is a visible light camera, the inner corners of the eyes of the user may be treated as standard points, the irises of the eyes of the user may be treated as moving points, and the direction of the line of sight of the user may be detected based on positional relationships between the standard points (inner corners) and the moving points (irises), for example. In addition, if the user camera 50 is an infrared light camera, corneal infrared light reflection points of the eyes of the user may be treated as standard points, the pupils of the user may be treated as moving points, and the direction of the line of sight of the user may be detected based on positional relationships between the standard points (corneal reflection points) and the moving points (pupils), for example.

In step 156, the photographing controller 20 sets a variable i for identifying a monitoring camera 42 to 1. In step 158, the acquirer 12 acquires a monitoring image (hereinafter referred to as monitoring image i) from an i-th monitoring camera 42. In step 160, the object extractor 22 extracts regions of all objects (persons) included in the monitoring image i acquired by the acquirer 12.

The object extractor 22 may use any of known various methods to extract the objects (persons). As an example, a difference between the monitoring image i and a background image photographed by the i-th monitoring camera 42 in advance is calculated and a differential region indicating the difference is extracted. The photographing ranges of the monitoring cameras 42 are variable in the embodiment. However, while the photographing ranges may be different from each other, multiple background images may be acquired and the difference may be calculated using a background image that is most approximate to the photographing range of the current i-th monitoring camera 42.

Next, the extracted differential region is binarized, noise is removed, and labeling is executed to separate the differential region into multiple regions that may correspond to the objects (persons). Then, characteristic amounts such as the sizes and shapes of the separated regions are calculated for the separated regions, the accuracy of the regions corresponding to the objects (persons) is checked based on the calculated characteristic amounts, and a region corresponding to an item other than the objects (persons) is removed. Thus, the regions of all the objects (persons) included in the monitoring image i are extracted. It goes without saying that the objects (persons) may be extracted by a method other than the aforementioned method. After the regions of the objects are extracted, the regions of the objects (persons) may be traced using other characteristic amounts such as positions, colors (color histogram), or motion vectors on the monitoring image i or the like.

In step 162, the object extractor 22 registers or updates the object information 34 stored in the first storage section, based on the results of extracting the regions of the objects from the monitoring image i of the i-th monitoring camera 42. As illustrated in FIG. 7, the object information 34 includes attribute information of objects included in the monitoring images for the monitoring cameras 42. The attribute information of the objects includes object IDs, characteristic amount information, positional coordinates, image ranges, continuous photographing target flags, weight level flags, registered person flags, start times of continuous photographing, cumulative time periods for which the line of sight of the user remains on the objects, and line-of-sight remain flags.

The object extractor 22 registers or updates the object IDs, the characteristic amount information, the positional coordinates, and the image ranges among the aforementioned attribute information. The object IDs identify the objects. Hereinafter, a j-th object extracted from the monitoring image i is referred to as object $S_{ij}$. The characteristic amount information indicates characteristics of the objects and includes at least any group of sizes (heights or the like), shapes, colors (for example, color histograms), and motion vectors or includes a combination of the sizes, the shapes, the colors, and the motion vectors. The positional coordinates are the positions of the objects on the monitoring image i or are, for example, the centers of gravity of the objects. The image ranges are information indicating ranges occupying the objects on the monitoring image i. If the characteristic amount information includes the sizes, the ranges of the objects may be omitted.

If information of the objects extracted from the monitoring image i is not registered, the object extractor 22 newly registers, for the objects, the object IDs, the characteristic amount information, the positional coordinates, and the image ranges in the object information 34. If the information of the objects extracted from the monitoring image i is already registered, the object extractor 22 compares the characteristic amount information, the positional coordinates, and the image ranges with registered information for the objects and determines whether or not the information indicates registered objects. If the object extractor 22 determines that information of an object is already registered, the object extractor 22 updates characteristic amount information, positional coordinates, and image range of the object that have been registered in the object information 34. If the object extractor 22 determines that the information of the object is not registered, the object extractor 22 newly registers the information and an object ID of the object in the object information 34.

The object extractor 22 associates, for the objects, (changes in) characteristic amount information, positional coordinates, and image ranges, obtained in the object extraction process executed multiple times, of the objects with the object IDs and causes the characteristic amount information, the positional coordinates, the image ranges, and the object IDs to be stored in the memory 64 for determination by the abnormality determiner 28 described later.

In step 164, the identifying section 18 sets a variable j for identifying an object to 1. In the next step 166, the identifying section 18 reads, from the object information 34, information of the j-th object $S_{ij}$ extracted from the monitoring image i. In step 168, the identifying section 18 executes a continuous photographing target identification process of identifying whether or not the object $S_{ij}$ is to be subjected to the continuous photographing, based on the information of the object $S_{ij}$ that has been read in step 166.

The continuous photographing target identification process is described below with reference to FIG. 5. In step 200, the registered person identifying section 26 of the identifying section 18 determines whether or not the object $S_{ij}$ is already set as a registered person, based on whether or not a registered person flag included in the read information of the object $S_{ij}$ indicates ON. The registered person flag is set to ON when the object is determined as a registered person having the characteristic stored as the registered person information 40 in the second storage section 38. The registered person flag is initially set to OFF.

If the answer to the determination of step 200 is negative, the process proceeds to step 202. In step 202, the registered person identifying section 26 determines whether or not characteristic amount information of the object $S_{ij}$ matches the characteristic stored as the registered person information 40 in the second storage section 38. In the registered person information 40, the characteristic of the person who is among persons using the care facility and is desirable to be carefully watched or for which the degree of care to be provided is high or the like is registered. The registered person information 40 may include information such as a characteristic indicating how the person who is desirable to be carefully watched walks. If the characteristic amount information of the object $S_{ij}$ does not match the characteristic of the registered person indicated in the registered person information 40, the answer to the determination of step 202 is negative and the process proceeds to step 204.

In step 204, the continuous photographing target identifying section 24 determines whether or not the object $S_{ij}$ is already set as a continuous photographing target, based on whether or not a continuous photographing target flag included in the information of the object $S_{ij}$ indicates ON and whether or not a weight level $w_{ij}$ of the object $S_{ij}$ is equal to or larger than a lower limit value. The continuous photographing target flag is set to ON when the line of sight of the user remains on an image of the object for the predetermined time period or longer. The continuous photographing target flag is initially set to OFF. If the answer to the determination of step 204 is negative, the process proceeds to step 206.

In step 206, the continuous photographing target identifying section 24 determines whether or not the monitoring image i is being displayed as a main monitoring image in the main display 46. If the answer to the determination of step 206 is negative, the continuous photographing target identification process is terminated. Thus, continuous photographing target flags (described later) and weight levels w (described later) of objects included in the monitoring image i currently displayed as a thumbnail image in the auxiliary display 48 are not updated. In other words, the continuous photographing target flags and weight levels w of the objects included in the monitoring image i currently displayed as the thumbnail image in the auxiliary display 48 are maintained at the same values as those when the monitoring image i has previously been displayed as the main monitoring image in the main display 46.

On the other hand, if the answer to the determination of step 206 is positive, the process proceeds to step 208. In step 208, the continuous photographing target identifying section 24 acquires the direction, detected by the line-of-sight detector 16, of the line of sight of the user from the line-of-sight detector 16. Then, the continuous photographing target identifying section 24 determines whether or not the line of sight of the user is located on an image of the object $S_{ij}$, based on whether or not a position on the line of sight of the user is included in the image range of the object $S_{ij}$ on the display screen of the main display 46. If the line of sight of the user is not located on the image of the object $S_{ij}$, the answer to the determination of step 208 is negative and the process proceeds to step 210. In step 210, the continuous photographing target identifying section 24 sets, to 0, a remain flag of the object $S_{ij}$ and a cumulative time period T for which the line of sight of the user remains on the image of the object $S_{ij}$. Then, the continuous photographing target identifying section 24 terminates the continuous photographing target identification process.

If the line of sight of the user is located on the image of the object $S_{ij}$, the answer to the determination of step 208 is positive and the process proceeds to step 212. In step 212, the continuous photographing target identifying section 24 determines whether or not the remain flag of the object $S_{ij}$ is already set to 1. If the answer to the determination of step 212 is negative, the process proceeds to step 214. In step 214, the continuous photographing target identifying section 24 sets the remain flag of the object $S_{ij}$ to 1. Then, the continuous photographing target identifying section 24 terminates the continuous photographing target identification process.

If the answer to the determination of step 212 is positive, the process proceeds to step 216. In step 216, the continuous photographing target identifying section 24 updates the cumulative time period T by adding a predetermined time period (corresponding to a time interval in which each object is processed) to the cumulative time period T for which the line of sight of the user remains on the image of the object $S_{ij}$. In the next step 218, the continuous photographing target identifying section 24 determines whether or not the cumulative time period T updated in step 216 is equal to or longer than a threshold. If the answer to the determination of step 218 is negative, the continuous photographing target identifying section 24 terminates the continuous photographing target identification process. Thus, if the line of sight of the user becomes separated from the image of the object $S_{ij}$ before the cumulative time period T for which the line of sight of the user remains on the image of the object $S_{ij}$ reaches the threshold, the remain flag of the object $S_{ij}$ and the cumulative time period T for which the line of sight of the user remains on the image of the object $S_{ij}$ are set to 0 again.

If the line of sight of the user remains on the image of the object $S_{ij}$ for a time period equal to or longer than the threshold, the answer to the determination of step 218 is positive and the process proceeds to step 220. In step 220, the continuous photographing target identifying section 24 sets the continuous photographing target flag of the object $S_{ij}$ to 1, thereby setting the objects $S_{ij}$ as a continuous photographing target to be continuously photographed by the i-th monitoring camera 42 for a time period equal to or longer than the predetermined time period. In addition, the continuous photographing target identifying section 24 sets the start time $t_{ij}$ of the continuous photographing to be executed on the object $S_{ij}$ to the current time.

Figure 8A:
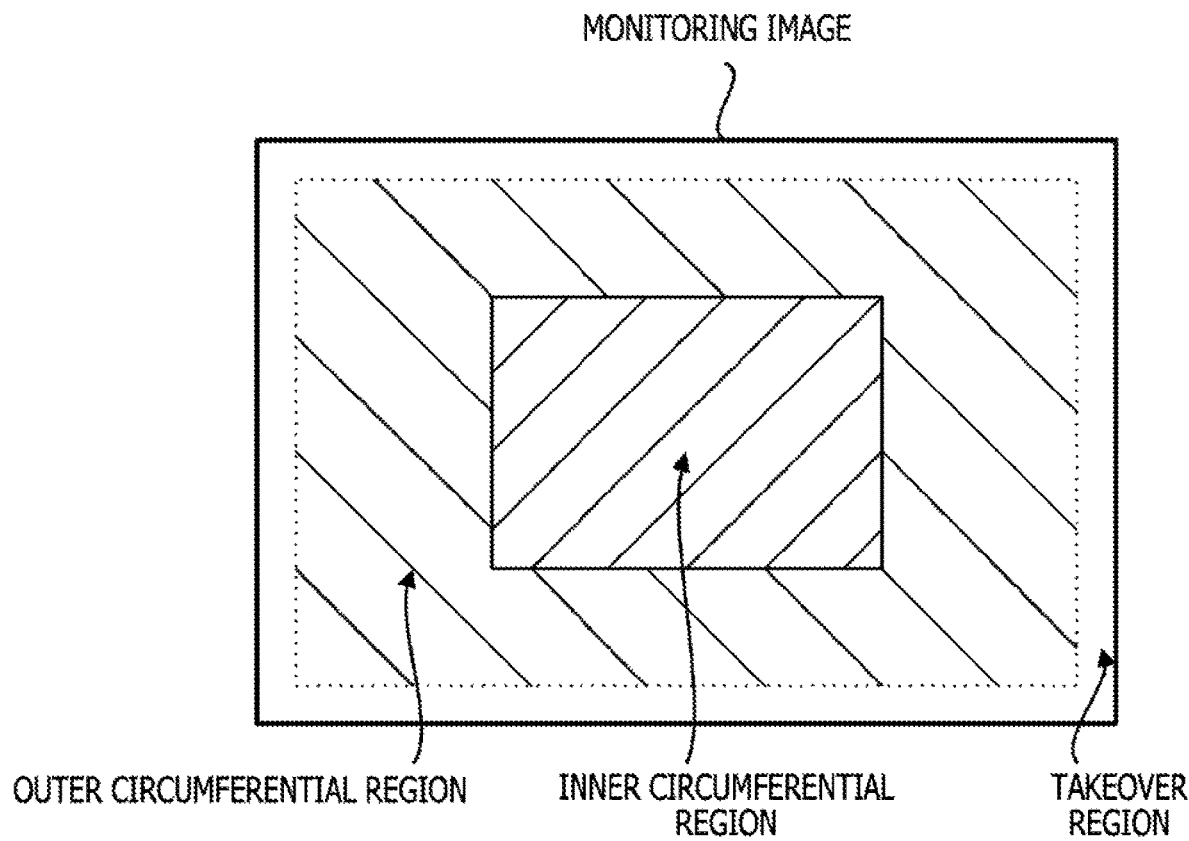
FIG. 8A is a schematic diagram illustrating an inner circumference region, an outer circumference region, and a takeover region.
Figure 8B:
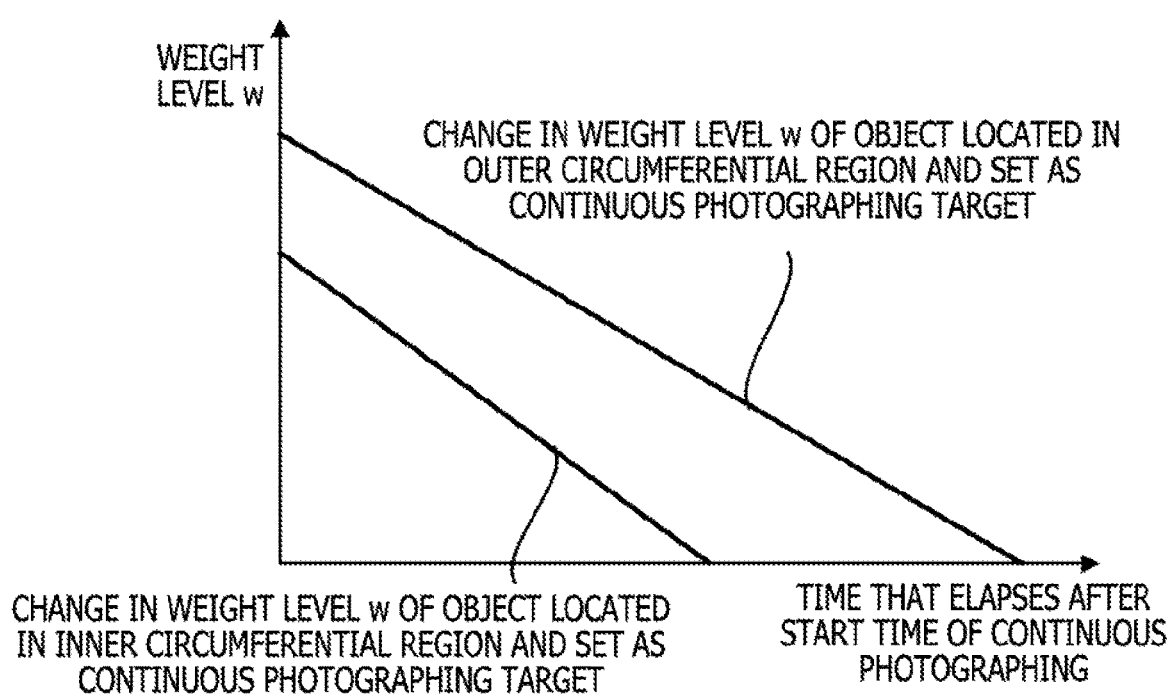
FIG. 8B is a diagrammatic view illustrating changes in weight levels for positions of an object set as a continuous photographing target.

In the next step 222, the continuous photographing target identifying section 24 sets the weight level $w_{ij}$ of the object $S_{ij}$ to an initial value corresponding to the position of the object $S_{ij}$ on the monitoring image i. In the embodiment, as illustrated in FIG. 8A, a region on the monitoring image is divided into an inner circumferential region including the center of the monitoring image, an outer circumferential region surrounding the circumference of the inner circumferential region, and a takeover region located around a circumferential edge of the outer circumferential region. As illustrated in FIG. 8B, the weight level w of the object set as the continuous photographing target is changed so that the initial value of the weight level w of the object located in the outer circumferential region is larger than the initial value of the weight level w of the object located in the inner circumferential region and that a reduction in the weight level w over time when the object is located in the outer circumferential region is smaller than a reduction in the weight level w over time when the object is located in the inner circumferential region. Since the weight level w is changed in the aforementioned manner, the object set as the continuous photographing target is continuously photographed for a time period equal to or longer than the predetermined time period to the time when the weight level w becomes lower than the lower limit value.

Thus, in step 222, the weight level $w_{ij}$ is set to the initial value that is based on whether the object $S_{ij}$ is located in the outer circumferential region or the inner circumferential region. If the object $S_{ij}$ is located in the takeover region, the object $S_{ij}$ is removed from continuous photographing targets to be continuously photographed by the i-th monitoring camera 42 in a target takeover and abnormality determination process (described later), and the weight level $w_{ij}$ of the object $S_{ij}$ is not set in step 222. In the next step 224, the continuous photographing target identifying section 24 sets, to 0, the cumulative time period T for which the line of sight of the user remains on the image of the object $S_{ij}$. Then, the continuous photographing target identifying section 24 terminates the continuous photographing target identifying process.

If the object $S_{ij}$ is already set as the continuous photographing target to be continuously photographed by the i-th monitoring camera 42 in step 204, the answer to the determination of step 204 is positive and the process proceeds to step 226. In step 226, the continuous photographing target identifying section 24 calculates a time elapsed from the start time $t_{ij}$ of the continuous photographing executed on the object $S_{ij}$. In the next step 228, the continuous photographing target identifying section 24 determines whether or not the monitoring image i is being displayed as the main monitoring image in the main display 46. If the answer to the determination of step 228 is negative, the continuous photographing target identifying section 24 terminates the continuous photographing target identification process.

If the answer to the determination of step 228 is positive, the process proceeds to step 230. In step 230, the continuous photographing target identifying section 24 acquires the direction, detected by the line-of-sight detector 16, of the line of sight of the user from the line-of-sight detector 16. Then, the continuous photographing target identifying section 24 determines whether or not the line of sight of the user is located on the image of the object $S_{ij}$. If the line of sight of the user is not located on the image of the object $S_{ij}$, the answer to the determination of step 230 is negative and the process proceeds to step 210. In step 210, the continuous photographing target identifying section 24 sets the remain flag of the object $S_{ij}$ to 0. Then, the continuous photographing target identifying section 24 terminates the continuous photographing target identification process.

If the line of sight of the user is located on the image of the object $S_{ij}$, the answer to the determination of step 230 is positive and the process proceeds to step 234. In step 234, the continuous photographing target identifying section 24 determines whether or not the remain flag of the object $S_{ij}$ indicates 1. If the answer to the determination of step 234 is negative, the process proceeds to step 236. In step 236, the continuous photographing target identifying section 24 sets the remain flag of the object $S_{ij}$ to 1. Then, the continuous photographing target identifying section 24 terminates the continuous photographing target identification process.

If the answer to the determination of step 234 is positive, the process proceeds to step 238. In step 238, the continuous photographing target identifying section 24 updates the cumulative time period T by adding the predetermined time period (corresponding to the time interval in which each object is processed) to the cumulative time period T for which the line of sight of the user remains on the image of the object $S_{ij}$. In the next step 240, the continuous photographing target identifying section 24 determines whether or not the cumulative time period T updated in step 238 is equal to or longer than the threshold.

If the answer to the determination of step 240 is negative, the process proceeds to step 242. In this case, it may be determined that the object Sij is not carefully watched by the user. Thus, in step 242, the continuous photographing target identifying section 24 subtracts, from the weight level $w_{ij}$ of the object $S_{ij}$, a predetermined value based on the position of the object $S_{ij}$ on the monitoring image i and a time elapsed from the start time $t_{ij}$ of the continuous photographing executed on the object $S_{ij}$. Specifically, a value that is obtained by multiplying the elapsed time by an inclination (refer to FIG. 8B) based on whether the object Sij is located in the outer circumferential region or the inner circumferential region is calculated as the predetermined value, and the calculated predetermined value is subtracted from the weight level $w_{ij}$ of the object $S_{ij}$. Then, the continuous photographing target identification process is terminated.

If the answer to the determination of step 240 is positive, the process proceeds to step 244. In this case, it may be determined that the degree at which the user carefully watches the object $S_{ij}$ is high. Thus, in step 244, the continuous photographing target identifying section 24 adds a predetermined value to the weight level $w_{ij}$ of the object $S_{ij}$. Then, the continuous photographing target identifying section 24 terminates the continuous photographing target identification process. The predetermined value added in step 244 may be a fixed value or may be changed based on whether the object $S_{ij}$ is located in the outer circumferential region or the inner circumferential region.

If the characteristic amount information of the object $S_{ij}$ matches the characteristic stored as the registered person information 40 in the second storage section 38 in step 202, the answer to the determination of step 202 is positive and the process proceeds to step 246. In step 246, the registered person identifying section 26 sets the registered person flag of the object $S_{ij}$ and the continuous photographing target flag of the object $S_{ij}$ to 1, thereby setting the object $S_{ij}$ as a registered person and a continuous photographing target. In step 248, the registered person identifying section 26 sets the weight level $w_{ij}$ of the object $S_{ij}$ to a predetermined value. Then, the registered person identifying section 26 terminates the continuous photographing target identification process.

The answer to the determination of step 200 executed on the object $S_{ij}$ set as the registered person is positive every time the determination of step 200 is made. If the answer to the determination of step 200 is positive, the continuous photographing target identification process is terminated and the setting state of the object $S_{ij}$ set as the registered person and the continuous photographing target is maintained.

When the aforementioned continuous photographing target identification process is terminated, the photographing control process (illustrated in FIG. 4) proceeds to step 170. In step 170, the identifying section 18 executes the target takeover and abnormality determination process. The target takeover and abnormality determination process is described with reference to FIG. 6.

In step 260 of the target takeover and abnormality determination process, the identifying section 18 determines whether or not the continuous photographing target flag of the object $S_{ij}$ indicates 1 and the identifying section 18 determines whether or not the object $S_{ij}$ is a continuous photographing target. If the answer to the determination of step 260 is negative, the process proceeds to step 270. If the object $S_{ij}$ is the continuous photographing target, the answer to the determination of step 260 is positive and the process proceeds to step 262. In step 262, the identifying section 18 determines whether or not the object $S_{ij}$ is located in the takeover region of the monitoring image i. If the answer to the determination of step 262 is negative, the process proceeds to step 270. If the answer to the determination of step 262 is positive, the process proceeds to step 264.

If the object $S_{ij}$ is the continuous photographing target and located in the takeover region of the monitoring image i, the identifying section 18 references the monitoring camera information 36 stored in the first storage section 32 in step 264. Then, the identifying section 18 recognizes the i-th monitoring camera 42 and a monitoring camera 42 whose photographing range is adjacent to the photographing range of the i-th monitoring camera 42 on the side on which the object $S_{ij}$ is located. The monitoring camera recognized in step 264 is hereinafter referred to as "k-th monitoring camera 42" for descriptive purposes.

In the next step 266, the identifying section 18 copies information indicating the object $S_{ij}$ and included in object information corresponding to the i-th monitoring camera 42 and included in the object information 34 stored in the first storage section 32 and adds the copied information to object information corresponding to the k-th monitoring camera 42. Positional coordinates $P_{ij}$ of the object $S_{ij}$ are temporarily converted into three-dimensional coordinate values set in the care site of the care facility and are reconverted into positional coordinates $P_{kx}$ on a monitoring image photographed by the k-th monitoring camera 42, and the positional coordinates $P_{kx}$ are set. Thus, the object $S_{ij}$ is additionally set as a continuous photographing target to be continuously photographed by the k-th monitoring camera 42, and the continuous photographing executed on the object $S_{ij}$ is taken over by the k-th monitoring camera 42 from the i-th monitoring camera 42. In the next step 268, the identifying section 18 sets, to 0, the continuous photographing target flag, included in the object information corresponding to the i-th monitoring camera 42, of the object $S_{ij}$, thereby removing the object $S_{ij}$ from continuous photographing targets to be continuously photographed by the i-th monitoring camera 42.

In step 270, the abnormality determiner 28 determines whether or not the object $S_{ij}$ has made an abnormal motion, based on changes in the characteristic amount information, positional coordinates, and image range of the object $S_{ij}$ that have been stored in the memory 64 in the object extraction process executed by the object extractor 22 multiple times. A typical example of the abnormal motion is a fall. The abnormal motion such as a fall may be determined based on a rapid change in the shape of the region of the object $S_{ij}$ or the like. If the answer to the determination of step 270 is negative, the target takeover and abnormality determination process is terminated.

If the object $S_{ij}$ has made an abnormal motion or fallen or the like, the answer to the determination of step 270 is positive and the process proceeds to step 272. In step 272, the notification signal output section 30 causes the notifier 52 to operate and output a notification signal for notifying the user of the abnormal motion. Thus, the abnormal motion of the object $S_{ij}$ that is the fall or the like is notified to the user. In addition, if the abnormal motion of the objects $S_{ij}$ is detected in a monitoring image displayed as a thumbnail image in the auxiliary display 48, the abnormal motion is notified to the user.

In step 274, the abnormality determiner 28 sets, to 1, the continuous photographing target flag, included in the object information corresponding to the i-th monitoring camera 42, of the object $S_{ij}$, thereby adding the object $S_{ij}$ to the continuous photographing targets to be continuously photographed by the i-th monitoring camera 42. In step 276, the abnormality determiner 28 sets, to a predetermined value, the weight level $w_{ij}$ of the object $S_{ij}$ that is included in the object information corresponding to the i-th monitoring camera 42. Then, the abnormality determiner 28 terminates the target takeover and abnormality determination process.

The process executed on the object $S_{ij}$ when the object $S_{ij}$ has made an abnormal motion or fallen or the like is not limited to the aforementioned process. The registered person flag may be set to 1 in advance and the object $S_{ij}$ may be set as the continuous photographing target for a longer time period.

Figure 4:
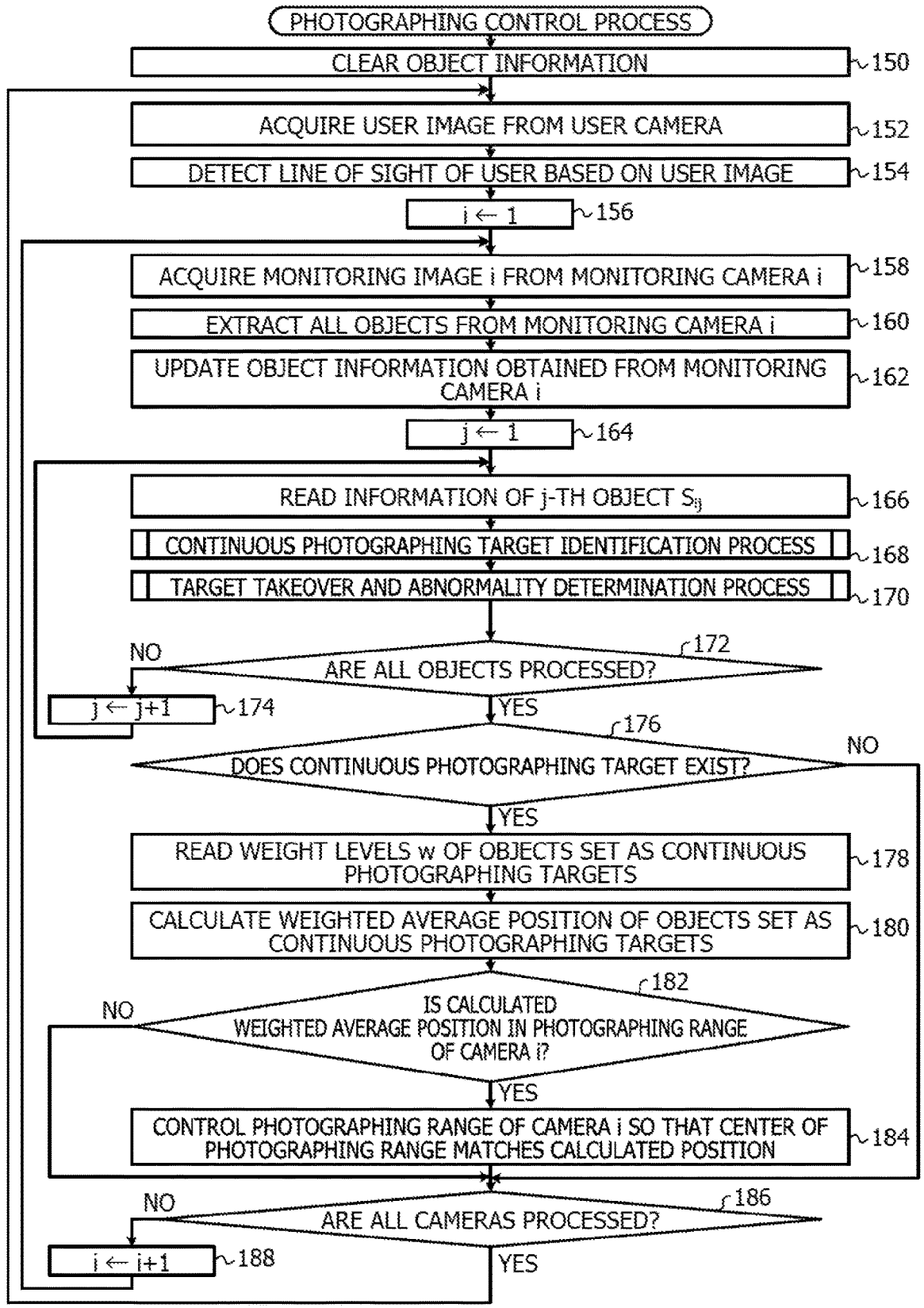
FIG. 4 is a flowchart of an example of a photographing control process.

When the aforementioned target takeover and abnormality determination process is terminated, the identifying section 18 determines whether or not all the objects included in the monitoring image i have been processed in step 172 of the photographing control process (illustrated in FIG. 4). If the answer to the determination of step 172 is negative, the process proceeds to step 174. In step 174, the identifying section 18 increments the variable j by 1. When the process of step 174 is executed, the process returns to step 166. Then, steps 166 to 174 are repeated until the answer to the determination of step 172 becomes positive. Thus, the continuous photographing target identification process and the target takeover and abnormality determination process are executed on all the objects included in the monitoring image i.

When the execution of the continuous photographing target identification process and the target takeover and abnormality determination process on all the objects included in the monitoring image i is completed, the answer to the determination of step 172 is positive and the process proceeds to step 176. In step 176, the photographing controller 20 references the object information corresponding to the i-th monitoring camera 42 and included in the object information 34 and determines whether or not an object set as a continuous photographing target to be continuously photographed by the i-th monitoring camera 42 exists. If information of one or more objects of which continuous photographing target flags have been set to 1 does not exist in the object information corresponding to the i-th monitoring camera 42, the answer to the determination of step 176 is negative and the process proceeds to step 186.

If the information of the one or more objects of which the continuous photographing target flags have been set to 1 exists in the object information corresponding to the i-th monitoring camera 42, the answer to the determination of step 176 is positive and the process proceeds to step 178. In step 178, the photographing controller 20 reads, from the object information corresponding to the i-th monitoring camera 42, weight levels w of the one or more objects of which the continuous photographing target flags have been set to 1.

In step 180, the photographing controller 20 calculates a weighted average position of the objects set as the continuous photographing targets to be continuously photographed by the i-th monitoring camera 42. For example, if the number of all the objects set as the continuous photographing targets to be continuously photographed by the i-th monitoring camera 42 is n, a weight level of an m-th continuous photographing target is $w_m$, and positional coordinates of the m-th object are $(x_m, y_m)$, a weight ratio $W_m$ of the m-th continuous photographing target is calculated according to the following Equation (1). The weighted average position (X, Y) of the objects set as the continuous photographing targets is calculated according to the following Equations (2).

$$W_m = w_m / \sum_{m=1}^{n} w_m \quad (1)$$

$$X = \sum_{m=1}^{n} W_m \cdot x_m \quad Y = \sum_{m=1}^{n} W_m \cdot y_m \quad (2)$$

In step 182, the photographing controller 20 determines whether or not the weighted average position (X, Y), calculated in step 180, of the objects set as the continuous photographing targets is in the photographing range of the i-th monitoring camera 42. If the answer to the determination of step 182 is positive, the process proceeds to step 184.

In step 184, the photographing controller 20 outputs a control signal for controlling the photographing range of the i-th monitoring camera 42 to a photographing range changer 44 corresponding to the i-th monitoring camera 42 so that the center of the photographing range of the i-th monitoring camera 42 matches the calculated weighted average position (X, Y). Specifically, the control signal causes the center of the photographing range of the i-th monitoring camera 42 to match the calculated weighted average position (X, Y) of the objects set as the continuous photographing targets to be continuously photographed by the i-th monitoring camera 42. If the answer to the determination of step 182 is negative, step 184 is skipped and the process proceeds to step 186.

In step 186, the photographing controller 20 determines whether or not the aforementioned process has been executed on all the monitoring cameras 42. If the answer to the determination of step 186 is negative, the process proceeds to step 188. In step 188, the photographing controller 20 increments the variable i by 1 and the process returns to step 158. Then, steps 158 to 188 are repeated until the answer to the determination of step 186 becomes positive and the aforementioned process is executed on all the monitoring cameras 42. If the answer to the determination of step 186 is positive, the process returns to step 152 and all the processes are repeated in order from the detection of the line of sight of the user.

Effects of the aforementioned photographing control process are described with reference to the FIGS. 9A to 14B. As described above, an object that is among objects included in a main monitoring image displayed in the main display 46 and toward which the user directs his or her line of sight for a time period equal to or longer than the threshold is set as a continuous photographing target.

Figure 9A:
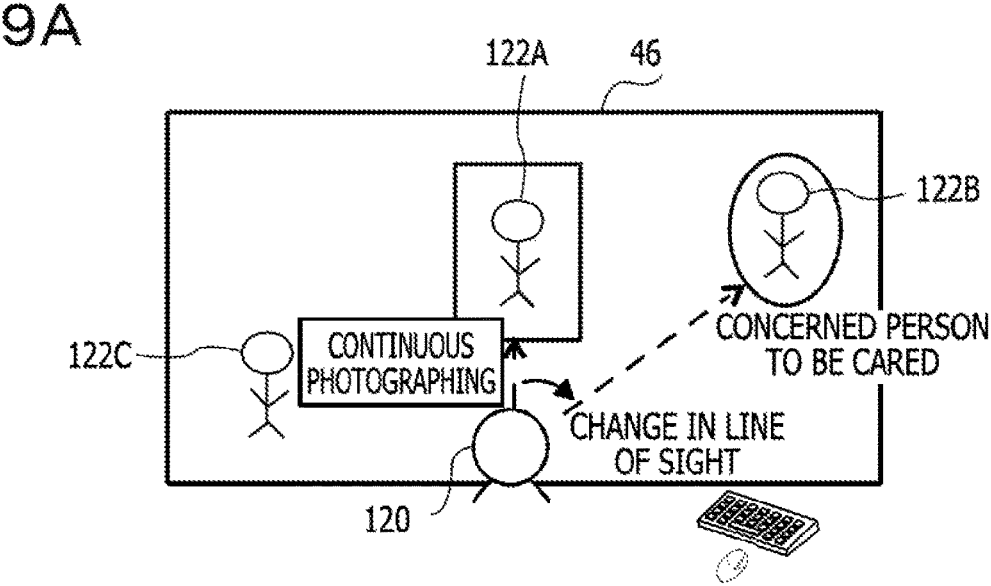
FIG. 9A is an image diagram describing the addition of a continuous photographing target due to a change in the line of sight.
Figure 9B:
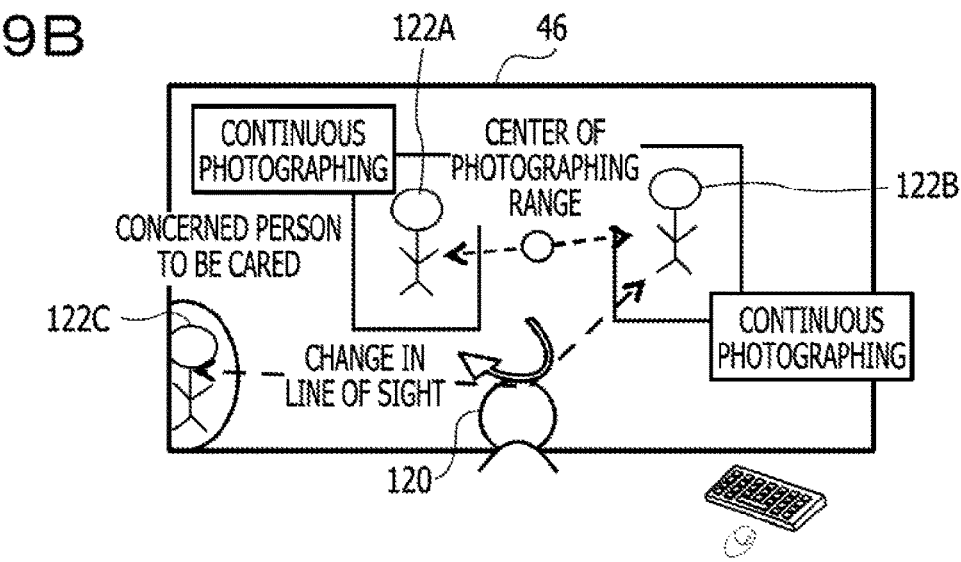
FIG. 9B is an image diagram describing the addition of a continuous photographing target due to a change in the line of sight.

As illustrated in FIG. 9A, when a user 120 becomes aware of an object (person to be cared) 122B that is included in a main monitoring image and is not set as a continuous photographing target, the user 120 directs his or her line of sight toward the concerned object 122B as a natural motion. Then, when the user 120 continues to direct his or her line of sight toward the concerned object 122B for a time period equal to or longer than the threshold, the object 122B toward which the user 120 directs his or her line of sight is additionally set as a continuous photographing target, as illustrated in FIG. 9B. Due to the setting, the center of the photographing range of a monitoring camera 42 photographing the main monitoring image is moved to a weighted average position of an object 122A already set as a continuous photographing target and the object 122B additionally set as the continuous photographing target. Thus, the range of the main monitoring image is controlled to a range in which it is appropriate to watch the objects 122A and 122B set as the continuous photographing targets without any operation by the user 120.

Figure 9C:
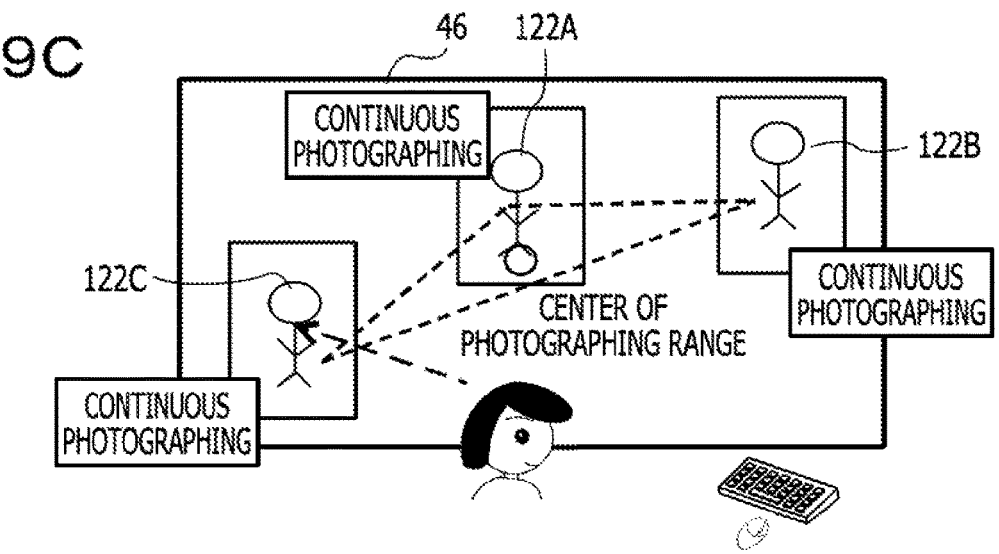
FIG. 9C is an image diagram describing the addition of a continuous photographing target due to a change in the line of sight.

In addition, as illustrated in FIG. 9B, when the user 120 becomes aware of an object (person to be cared) 122C that is included in the main monitoring image and is not set as a continuous photographing target, the user 120 directs his or her line of sight toward the concerned object 122C as a natural motion. Then, if the user 120 continues to direct his or her line of sight toward the concerned object 122C for a time period equal to or longer than the threshold, the object 122C toward which the user 120 directs his or her line of sight is additionally set as a continuous photographing target, as illustrated in FIG. 9C. Due to the setting, the center of the photographing range of the monitoring camera 42 photographing the main monitoring image is moved to a weighted average position of the objects 122A, 122B, and 122C set as the continuous photographing targets. Thus, the range of the main monitoring image is controlled to a range in which it is appropriate to watch the objects 122A, 122B, and 122C set as the continuous photographing targets without any operation by the user 120.

Figure 10A:
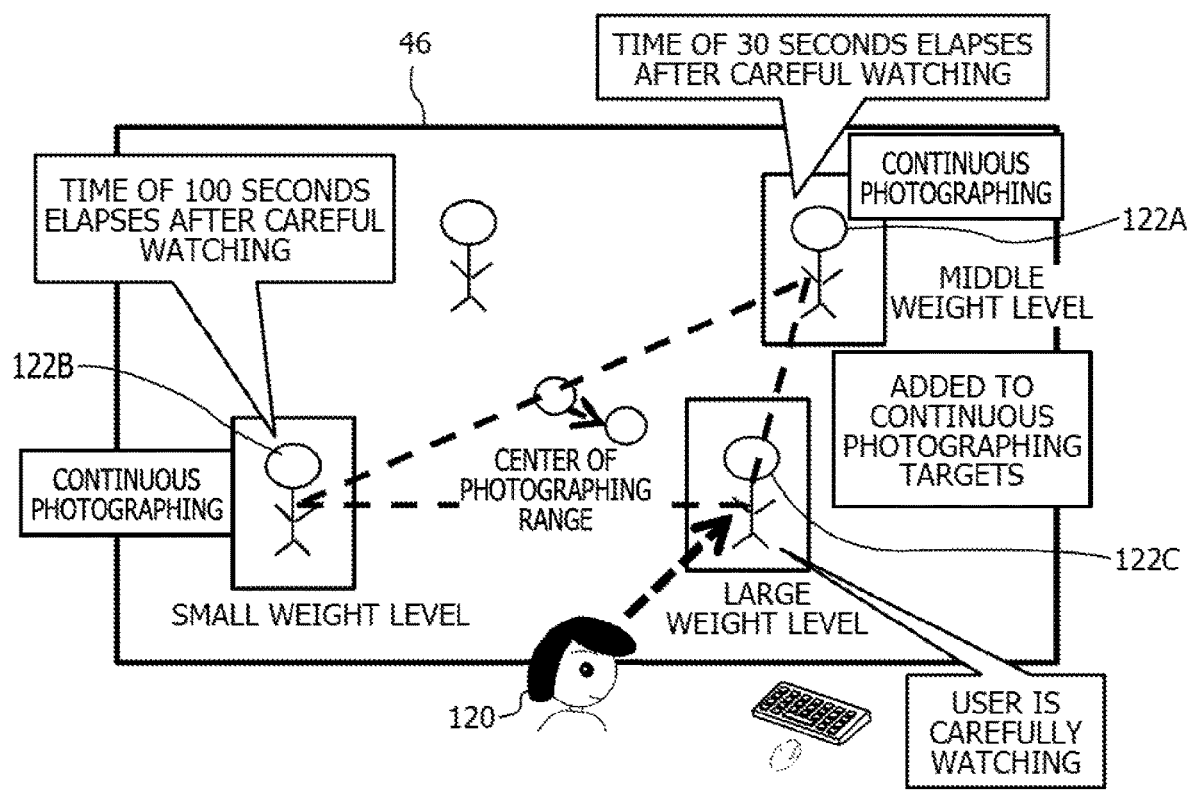
FIG. 10A is an image diagram describing a change in a photographing range based on time elapsed after careful watching.

Next, as illustrated in FIG. 10A, the following state is considered: the two objects 122A and 122B are already set as continuous photographing targets, and the center of the photographing range of the monitoring camera 42 photographing the main monitoring image is located at a weighted average position of the objects 122A and 122B set as the continuous photographing targets. It is assumed that a time of 30 seconds elapses after the object 122A is set as the continuous photographing target due to the careful watching of the object 122A by the user 120. It is assumed that a time of 100 seconds elapses after the object 122B is set as the continuous photographing target due to the careful watching of the object 122B by the user 120. In this state, when the user 120 becomes aware of the object 122C and continues to direct his or her line of sight toward the object 122C for a time period equal to or longer than the threshold, the object 122C is additionally set as a continuous photographing target.

Figure 10B:
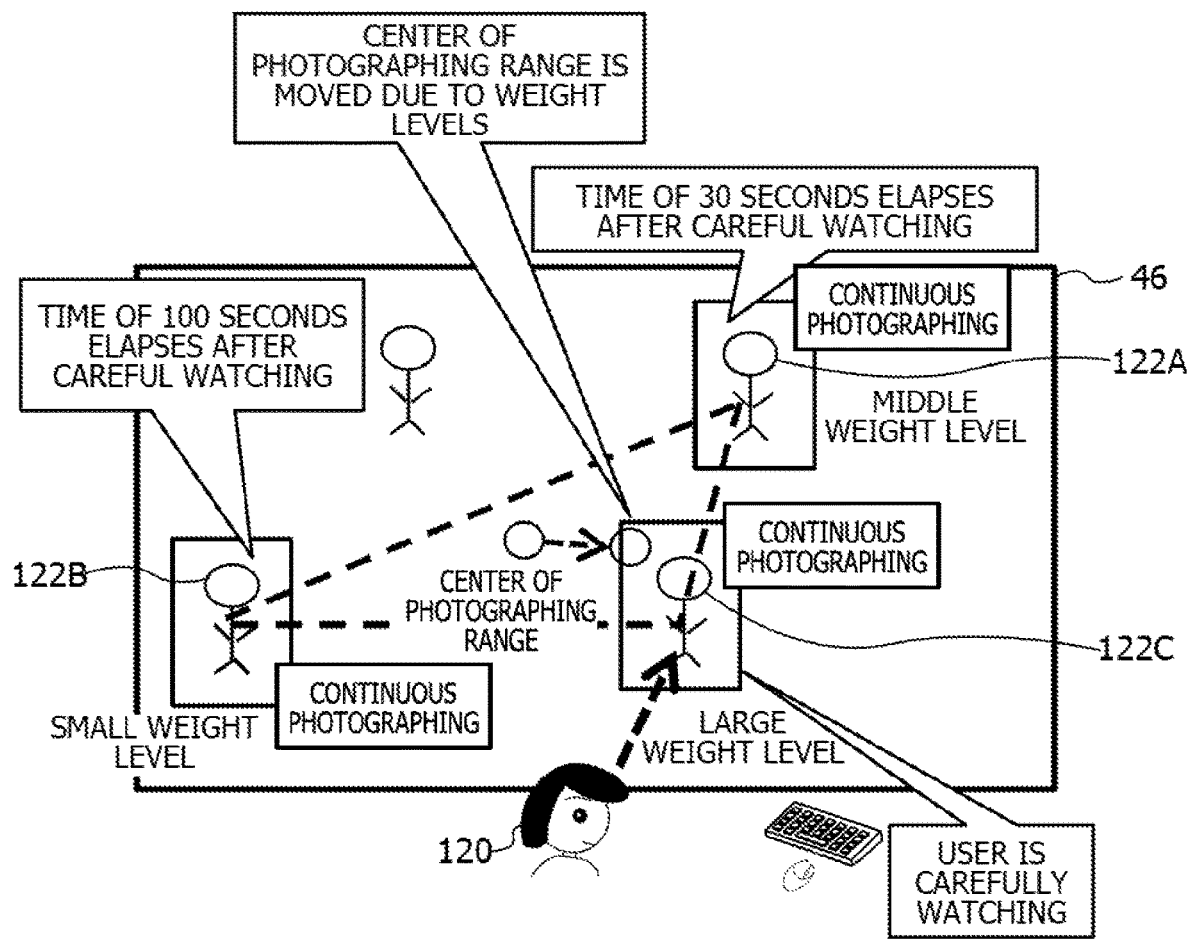
FIG. 10B is an image diagram describing a change in the photographing range based on time elapsed after careful watching.

Time elapses after the user 120 starts to carefully watch the objects 122A and 122B, but it is considered that the user 120 is carefully watching the object 122C and most aware of the object 122C at the current time. In the embodiment, weight levels w of the objects are reduced over time after the objects are set as the continuous photographing targets (refer to step 242 illustrated in FIG. 5). A relative weight level w (weight ratio W) of the object 122C is larger than those of the objects 122A and 122B since there are differences between time that elapses after the objects are set as the continuous photographing targets. Thus, as illustrated in FIG. 10B, the center of the photographing range of the monitoring camera photographing the main monitoring image is moved toward the object 122C and controlled to a range in which it is appropriate to watch the object 122C without any operation by the user 120.

Figure 5A:
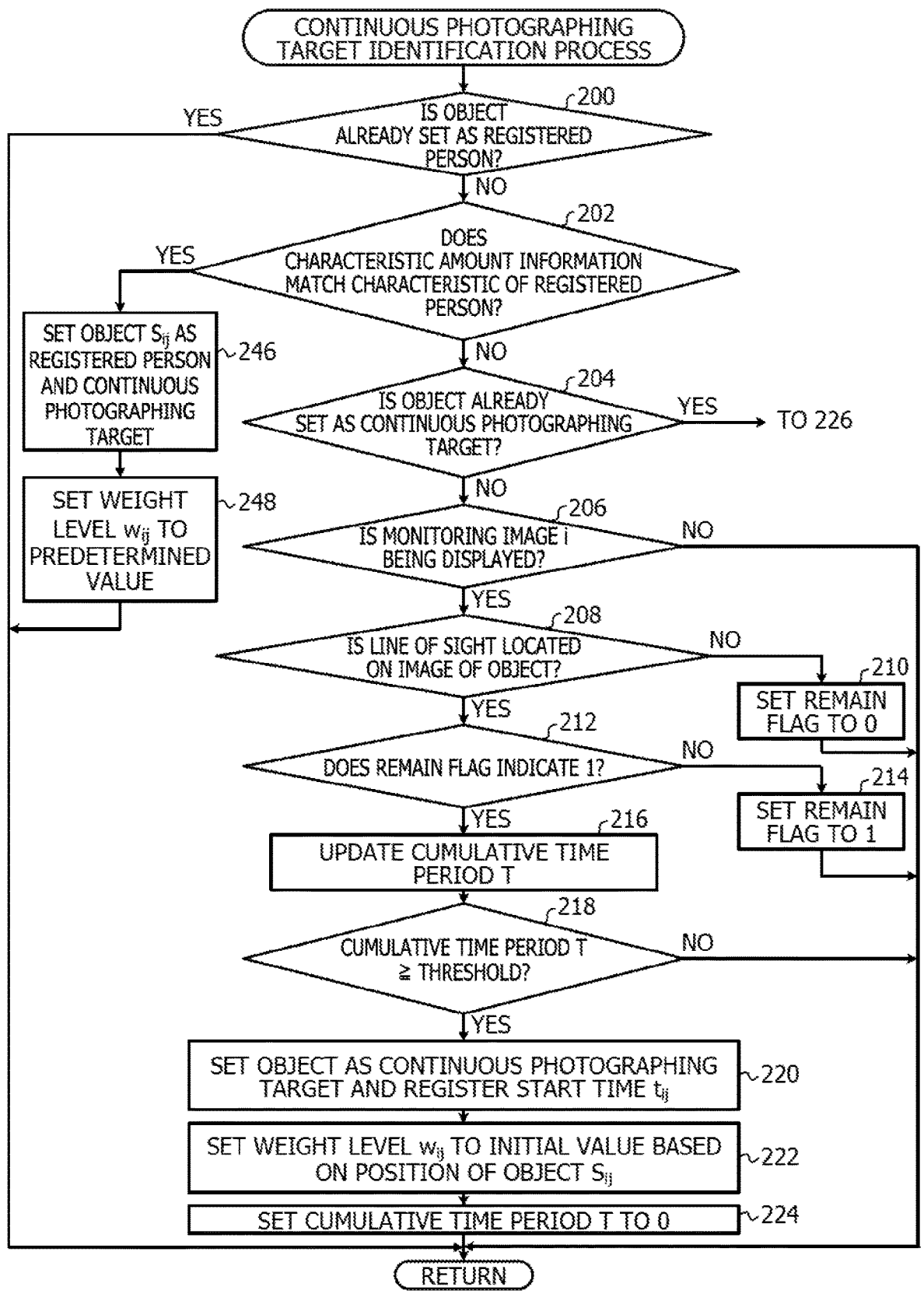
FIG. 5A is a flowchart of an example of a continuous photographing target identification process.

When a long time elapses after a certain object is set as a continuous photographing target, and the line of sight of the user 120 remains on an image of the certain object for a cumulative time period equal to or longer than the threshold, the weight level w of the certain object is increased (refer to steps 240 and 244 illustrated in FIG. 5). Thus, when the user 120 is aware of an object (or directs his or her line of sight toward the object) even after the setting of the object as a continuous photographing target, the object is maintained as the continuous photographing target and is continuously photographed by the monitoring camera 42 photographing the main monitoring image.

Figure 11A:
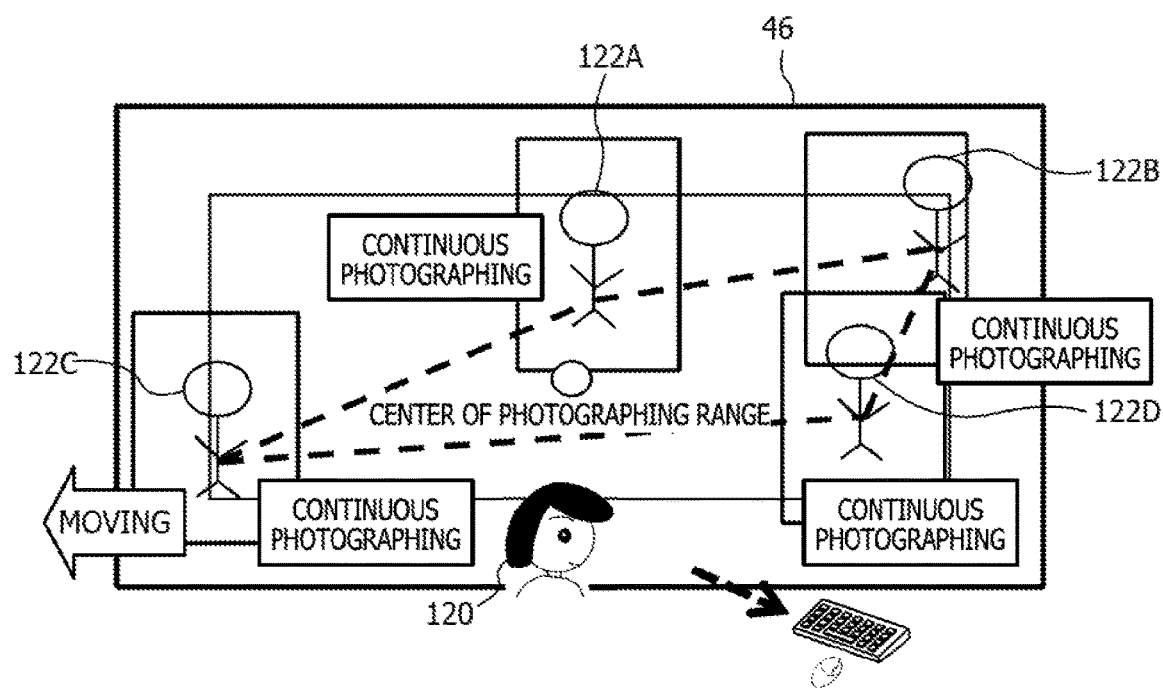
FIG. 11A is an image diagram describing a change in a photographing range due to a movement of an object set as a continuous photographing target.

Subsequently, as illustrated in FIG. 11A, the following state is considered: four objects 122A to 122D are already set as continuous photographing targets and the center of the photographing range of the monitoring camera 42 photographing the main monitoring image is located at a weighted average position of the objects 122A to 122D set as the continuous photographing targets. In this state, if the object (person to be cared) 122C moves from the inner circumferential region of the main monitoring image to the outer circumferential region of the main monitoring image, a probability at which the object 122C departs from the range of the main monitoring image increases.

Figure 11B:
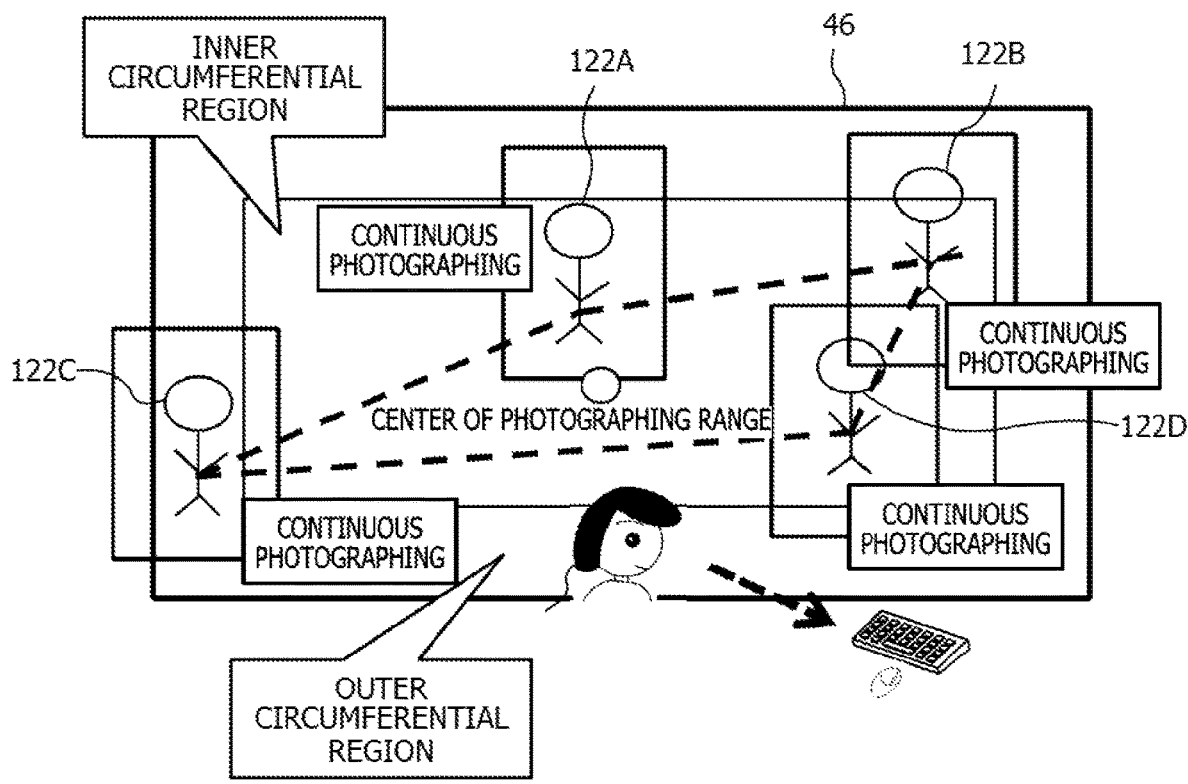
FIG. 11B is an image diagram describing the change in the photographing range due to the movement of the object set as the continuous photographing target.

In the embodiment, however, a weight level w of an object set as a continuous photographing target is changed so that a reduction over time in the weight level w of the object located in the outer circumferential region is smaller than a reduction over time in the weight level w of the object located in the inner circumferential region. Thus, a reduction over time in the weight level w of the object 122C located in the outer circumferential region of the main monitoring image is smaller than reductions over time in the weight levels w of the objects 122A, 122B, and 122D located in the inner circumferential region of the main monitoring image, and the relative weight level w (weight ratio W) of the object 122C becomes larger than those of the objects 122A, 122B, and 122D. Thus, as illustrated in FIG. 11B, the center of the photographing range of the monitoring camera 42 photographing the main monitoring image is moved toward the object 122C, and this movement of the center of the photographing range may inhibit the object 122C from departing from the range of the main monitoring image without any operation by the user 120.

Figure 12A:
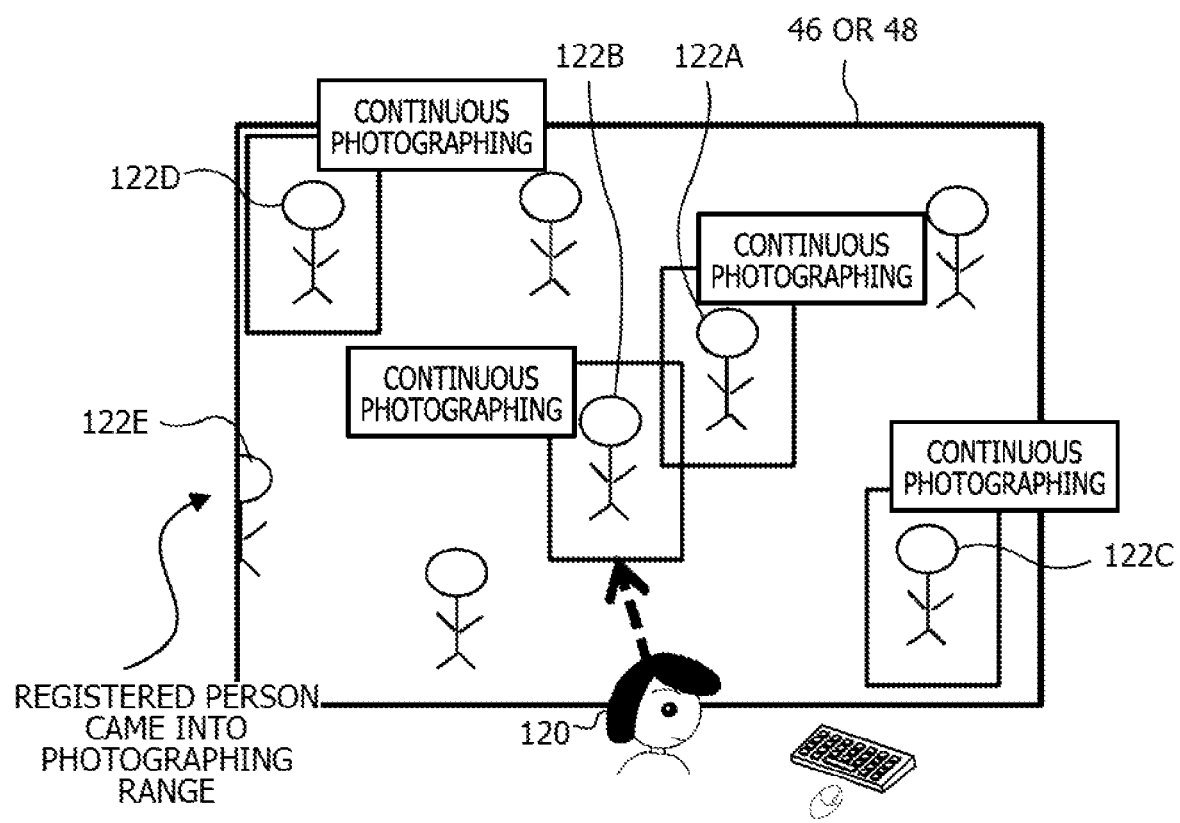
FIG. 12A is an image diagram describing the addition of a registered person who came into a photographing range to continuous photographing targets.
Figure 12B:
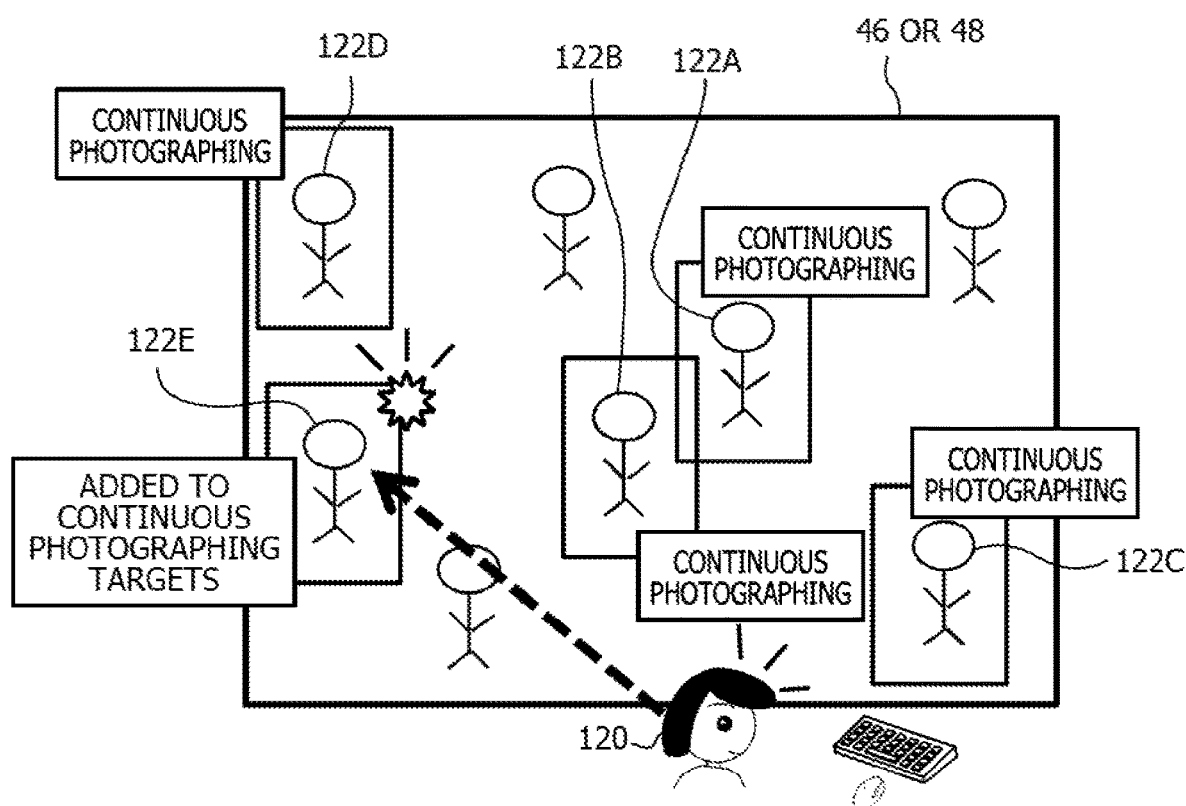
FIG. 12B is an image diagram describing the addition of the registered person who came into the photographing range to the continuous photographing targets.

Next, as illustrated in FIG. 12A, it is assumed that the four objects 122A to 122D are set as continuous photographing targets and that an object 122E (person to be cared) that is a registered person came into the photographing range of the monitoring camera 42 photographing the main monitoring image. In the embodiment, when an object whose characteristic amount information matches the characteristic of the registered person indicated in the registered person information 40 is detected, the object is set as a registered person and a continuous photographing target. Thus, as illustrated in FIG. 12B, the object 122E that came into the photographing range is additionally set as a continuous photographing target, and the center of the photographing range of the monitoring camera 42 photographing the main monitoring image is moved to a position included in the photographing range including the object 122E.

Thus, since a characteristic of a person who is to be cared and desirable to be carefully watched or for which the degree of care to be provided is high is registered in the registered person information 40 in advance, the person to be cared is automatically additionally set as a continuous photographing target without any operation by the user 120. In the embodiment, whether or not objects included in monitoring images displayed as thumbnail images in the auxiliary display 48 are registered persons is determined, and a weight level w of an object set as a registered person is not changed. Thus, the registered person is maintained as a continuous photographing target and is continuously photographed by one or more monitoring cameras 42 among the multiple monitoring cameras 42.

Figure 13A:
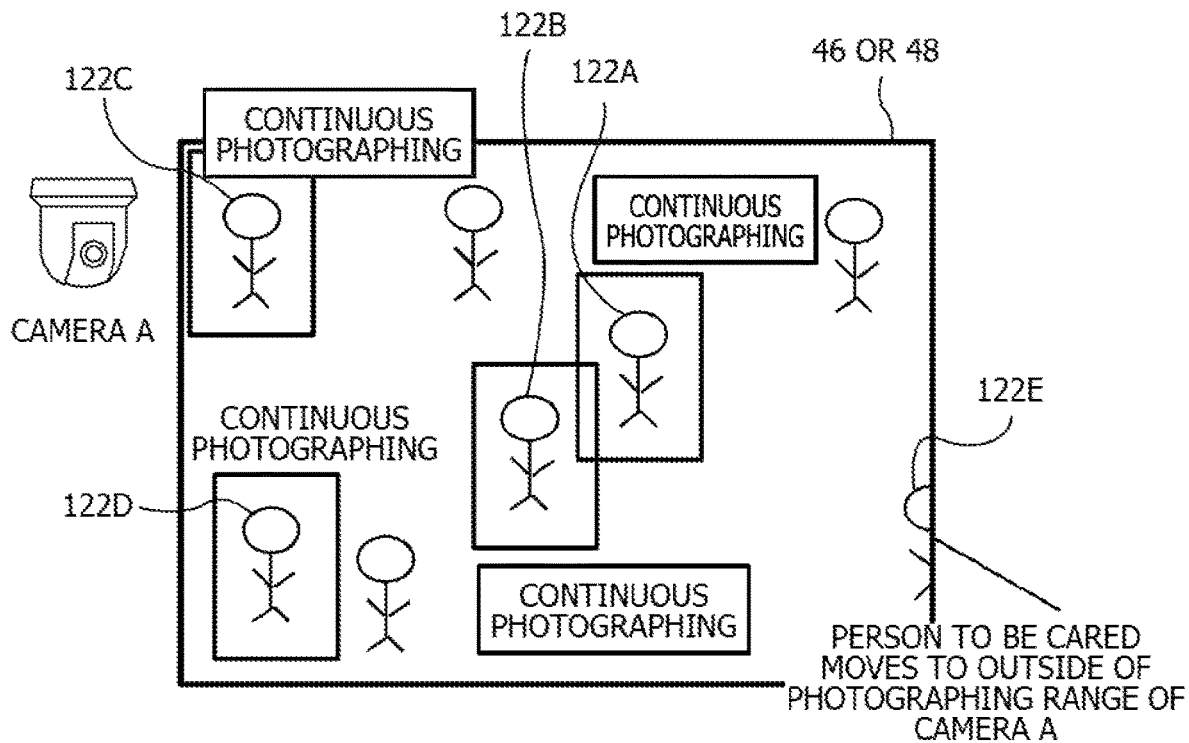
FIG. 13A is an image diagram describing a process of taking over, by a camera, a continuous photographing target that has moved to a takeover region of another camera.

Next, as illustrated in FIG. 13A, it is assumed that the object 122E moves to the outside of the photographing range of a monitoring camera 42 photographing a main monitoring image in a state in which the five objects 122A to 122E are already set as continuous photographing targets. In the embodiment, when an object set as a continuous photographing target is located in the takeover region of the monitoring image i, the continuous photographing executed on the object located in the takeover region is taken over by the k-th monitoring camera 42 whose photographing range is adjacent to the photographing range of the i-th monitoring camera 42 from the i-th monitoring camera 42 that has acquired the monitoring image i.

Figure 13B:
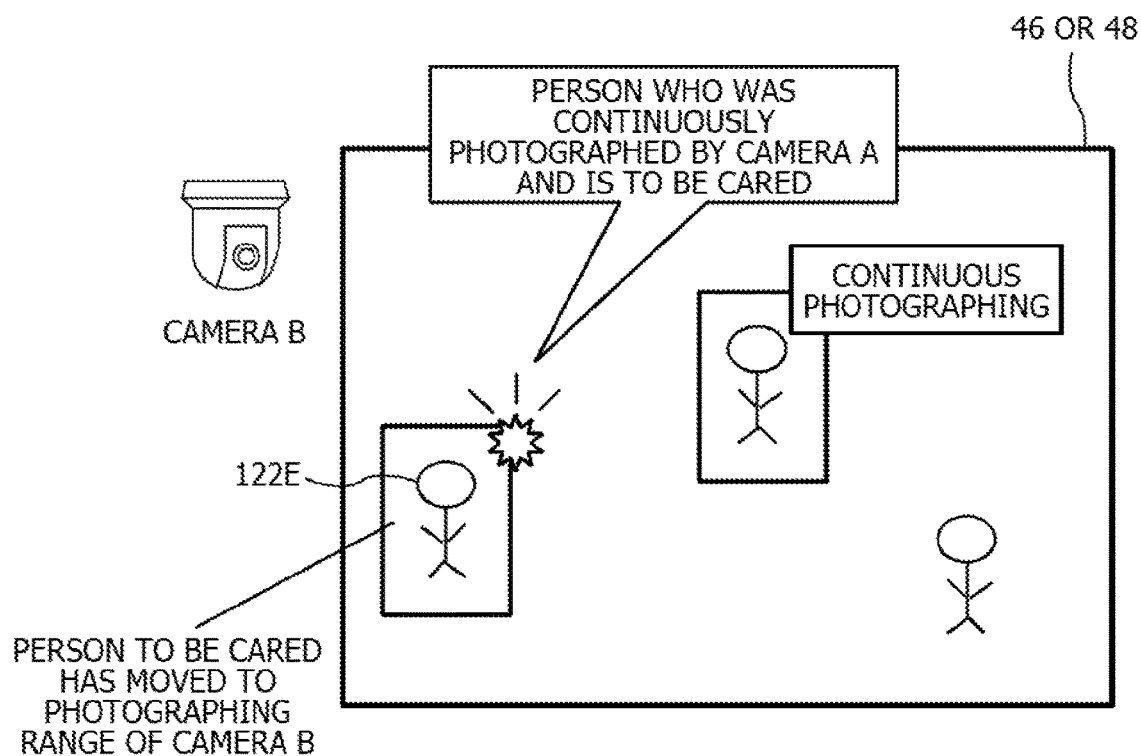
FIG. 13B is an image diagram describing a process of taking over, by the camera, the continuous photographing target that has moved to the takeover region of the other camera.

Thus, when the object 122E moves to the takeover region of the monitoring image illustrated in FIG. 13A, the continuous photographing executed on the object 122E is taken over by a monitoring camera 42 (whose photographing range includes a place to which the object 122E has moved) photographing a monitoring image illustrated in FIG. 13B. Thus, even when an object set as a continuous photographing target moves to the outside of the photographing range of a certain monitoring camera 42, the continuous photographing executed on the object is taken over by another monitoring camera 42 whose photographing range is adjacent to the photographing range of the certain monitoring camera 42 without any operation by the user 120. Then, the center of the photographing range of the other monitoring camera 42 that has taken over the continuous photographing is moved to a position included in the photographing range including the object 122E that has moved.

Figure 14A:
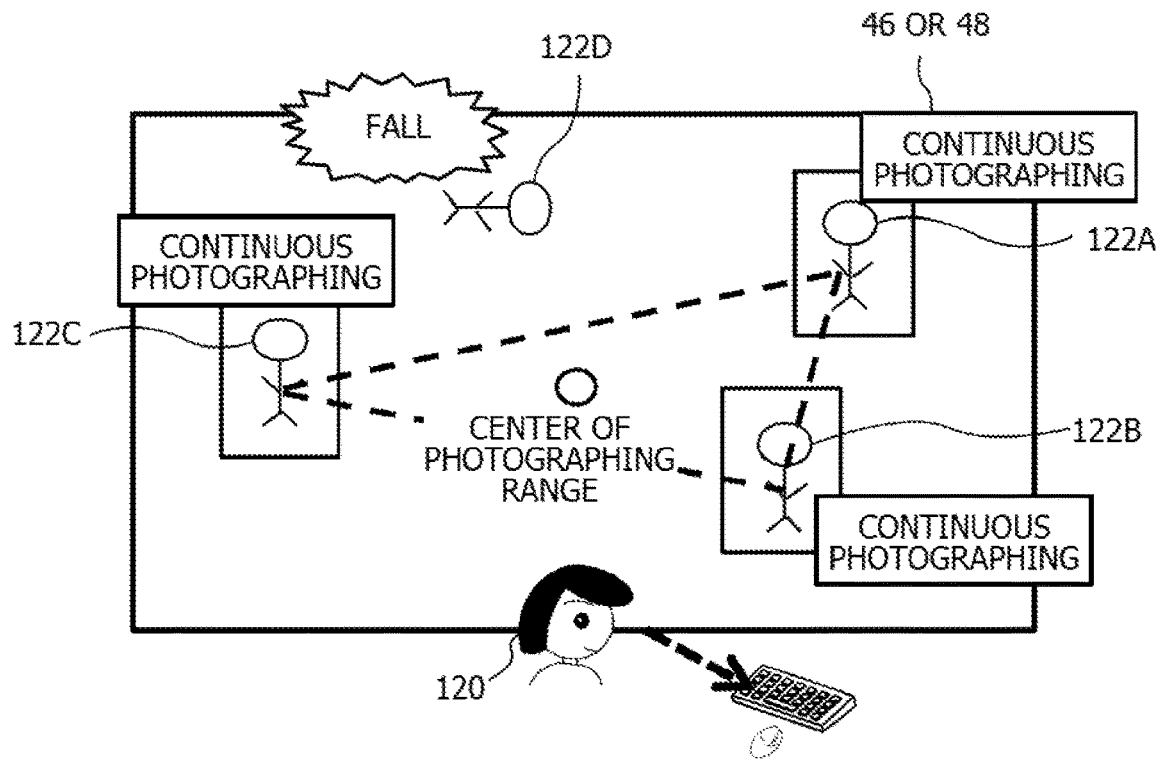
FIG. 14A is an image diagram describing a process of notifying of an abnormal motion of an object and adding the object to continuous photographing targets.

Subsequently, as illustrated in FIG. 14A, it is assumed that while the three objects 122A to 122C are already set as continuous photographing targets, the object 122D that is not set as a continuous photographing target has fallen. In the embodiment, when an abnormal motion such as a fall is detected, the abnormal motion is notified to the user regardless of whether or not an object that has made the abnormal motion is a continuous photographing target, and the object of which the abnormal motion is detected is additionally set as a continuous photographing target.

Figure 14B:
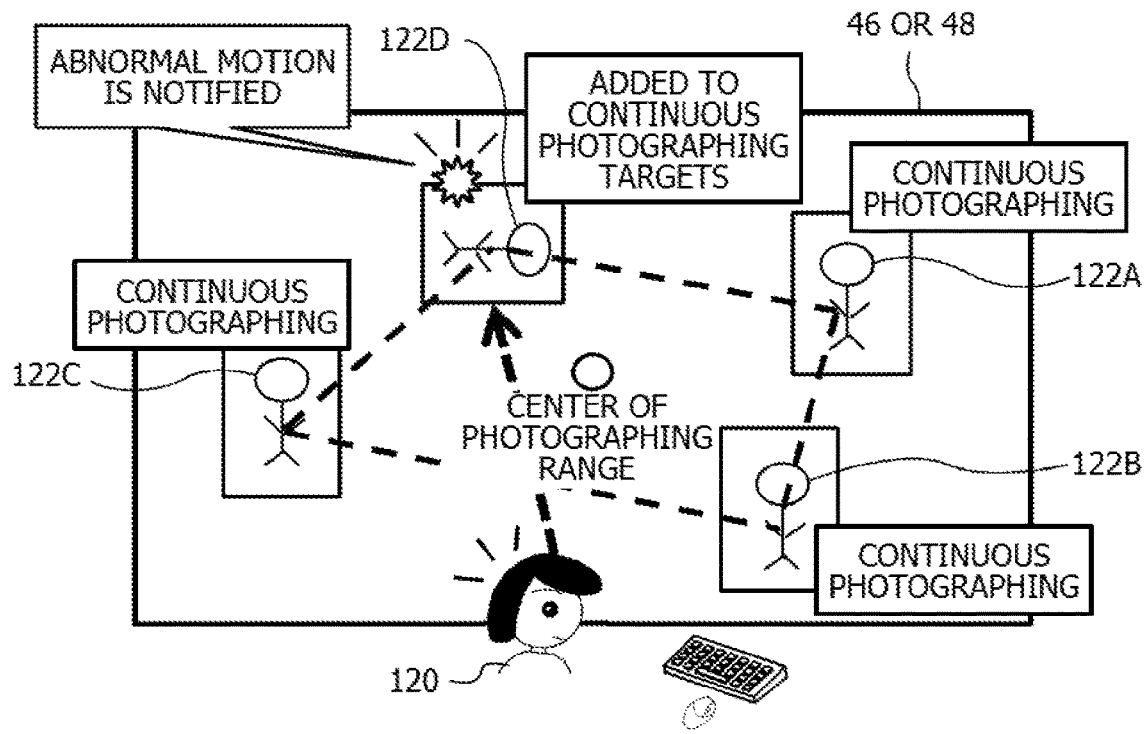
FIG. 14B is an image diagram describing the process of notifying of the abnormal motion of the object and adding the object to the continuous photographing targets.

Thus, as illustrated in FIG. 14B, when the abnormal motion (fall) of the object 122D is detected, the abnormal motion is notified to the user 120, the object 122D is additionally set as a continuous photographing target, and the center of the photographing range of the monitoring camera 42 is moved toward the object 122D. Thus, the user 120 may immediately confirm the state of the person who is to be cared and of which the abnormal motion has been detected, and the user 120 may notify a caregiver of the state of the person and immediately go to the care site or take appropriate measures. If a monitoring image that includes the object 122D is displayed as a thumbnail image in the auxiliary display 48, the user carefully watches the thumbnail image, thereby causing the monitoring image including the object 122D to be displayed in the main display 46.

According to the embodiment, the acquirer 12 acquires a monitoring image photographed by a monitoring camera 42 and a user image photographed by the user camera 50 and indicating the user who has visibility of the monitoring image displayed in the main display 46. The line-of-sight detector 16 detects the line of sight of the user based on the user image acquired by the acquirer 12. The identifying section 18 identifies an object included in the monitoring image on the display screen of the main display 46 and displayed at the position of the line, detected by the line-of-sight detector 16, of sight of the user on the display screen of the main display 46. The imaging control section 20 outputs a control signal for controlling the photographing direction of the monitoring camera 42 so that the object identified by the identifying section 18 is continuously photographed as the monitoring image for the predetermined time period or longer. Thus, the technique for controlling the cameras configured to photograph monitoring images in which objects to be monitored are included in photographing regions may be provided. In addition, the burden on the user who visually checks the monitoring images may be reduced, and the user may watch, on a monitoring image, a person who is to be cared and to which a caregiver temporarily pays insufficient attention during a task for which the user is responsible.

According to the embodiment, the identifying section 18 identifies an object displayed in a region in which the line of sight of the user remains for a predetermined time period or longer on the display screen of the main display 46. Thus, an image of an object that crosses the line of sight of the user during the time when the user changes his or her line of sight may be removed from continuous photographing targets, and only an object included in an image carefully watched by the user may be identified as a continuous photographing target.

According to the embodiment, if the identifying section 18 identifies multiple objects, the photographing controller 20 outputs a control signal so that all the multiple objects are simultaneously photographed as the monitoring image. Thus, the user who visually checks the single monitoring image and may simultaneously watch the multiple objects to be subjected to the continuous photographing.

According to the embodiment, the photographing controller 20 outputs a control signal for controlling the photographing direction of the monitoring camera 42 so that the center of the photographing range of the monitoring camera 42 is located at a position separated by a predetermined distance or less from a standard position of a range including all the multiple objects. Thus, the photographing range of the monitoring camera 42 is controlled to a range in which it is appropriate to simultaneously watch the multiple objects to be subjected to the continuous photographing.

According to the embodiment, the identifying section 18 gives weight levels to the multiple objects so that the weight levels are reduced as time elapses after the setting of the objects as continuous photographing targets. Then, the photographing controller 20 sets a weighted average position of the multiple objects to the standard position of the range including all the objects. Thus, the center of the photographing range of the monitoring camera 42 may become close to an object image carefully watched by the user for the shortest elapsed time, and the photographing range of the monitoring camera 42 may be controlled to a photographing range intended by the user.

According to the embodiment, the identifying section 18 measures, for the objects set as the continuous photographing targets, cumulative time periods for which the line of sight of the user remains on the objects, and the identifying section 18 gives weight levels to the objects so that the weight levels are increased as the cumulative time periods for which the line of sight of the user remains on the objects become longer. Then, the photographing controller 20 sets a weighted average position of the multiple objects to the standard position of the range including all the multiple objects. Thus, the center of the photographing range of the monitoring camera 42 may become close to an object on which the line of sight of the user remains for the longest cumulative time period, and the photographing range of the monitoring camera 42 may be controlled to a photographing range intended by the user.

According to the embodiment, if multiple monitoring cameras 42 whose photographing ranges are different from each other exist, the identifying section 18 causes, for the multiple monitoring cameras 42, information of the identified objects to be stored in the first storage section 32 as information of continuous photographing targets. In addition, the identifying section 18 removes, from information corresponding to a first monitoring camera 42 and indicating continuous photographing targets, information of a displayed object whose position has moved into a predetermined region included in a monitoring image photographed by the first monitoring camera 42. Furthermore, the identifying section 18 adds the removed information to information indicating continuous photographing targets and corresponding to a second monitoring camera 42 whose photographing range is adjacent to the photographing range of the first monitoring camera 42. Then, the photographing controller 20 outputs a control signal for controlling photographing directions of the multiple monitoring cameras 42, based on the information corresponding to the multiple monitoring cameras 42 and indicating the continuous photographing targets. Thus, even when an object set as a continuous photographing target moves to the outside of the photographing range of the first monitoring camera 42, the continuous photographing of the object is taken over by the second monitoring camera 42 whose photographing range is adjacent to the photographing range of the first monitoring camera 42, and the takeover may inhibit the photographing of the object set as the continuous photographing target from being stopped.

According to the embodiment, the object extractor 22 extracts one or more objects included in the monitoring image and the abnormality determiner 28 determines whether or not each of the objects extracted by the object extractor 28 has made an abnormal motion. If the abnormality determiner 28 determines that an object has made an abnormal motion, the notification signal output section 30 outputs a notification signal for notifying the user of the abnormality motion. Thus, the user may immediately confirm, on the monitoring image, the object determined to have made the abnormal motion and the notification signal may promote the user to take measures.

According to the embodiment, the object extractor 22 extracts one or more objects included in the monitoring image. The registered person identifying section 26 determines whether or not each of the objects extracted by the object extractor 22 has a specific object characteristic stored in the second storage section 38, and the registered person identifying section 26 identifies an object determined to have the specific object characteristic. Thus, the object (registered person) that has the specific object characteristic may be automatically set as a continuous photographing target.

The case where the photographing range changer 44 changes the photographing direction of a monitoring camera 42, thereby changing the photographing range of the monitoring camera 42 is described above. The embodiment, however, is not limited to this. The photographing range changer 44 may change the magnification of a monitoring camera 42, thereby changing the photographing range of the monitoring camera 42. Alternatively, the photographing range changer 44 may change the magnification and photographing direction of the monitoring camera 42, thereby changing the photographing range of the monitoring camera 42.

In addition, the case where the weighted average of the current positions of the multiple objects to be subjected to the continuous photographing is used as the standard position of the range including all the multiple objects is described above. The standard position, however, is not limited to the weighted average of the current positions of the multiple objects. For example, the standard position may be a weighted average of moving average positions of the multiple objects or a simple average of the current positions of the multiple objects.

In addition, the case where the monitoring camera 42 is controlled so that the center of the photographing range of the monitoring camera 42 matches the standard position of the range including all the multiple objects is described above. The embodiment, however, is not limited to this. For example, a future change in the standard position may be estimated based on a motion vector of the standard position of the range including all the multiple objects, and the monitoring camera 42 may be controlled so that the center of the photographing range of the monitoring camera 42 is moved in advance of the future change in the standard position.

In addition, the case where the photographing control program 80 that is an example of the photographing control program according to the technique disclosed herein is stored (installed) in the storage section 66 in advance is described above. The photographing control program, however, may be stored in a recording medium such as a CD-ROM, a DVD-ROM, or a memory card and provided.

All cited documents, patent applications, and technical standards mentioned in the present specification are incorporated by reference in the present specification to the same extent as if the individual cited documents, patent applications, and technical standards were specifically and individually incorporated by reference in the present specification.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A photographing control apparatus comprising:
    a memory configured to store a first image that is photographed by a first camera and a second image that is photographed by a second camera, the second image including an image of a user who has visibility of the first image displayed in a display device; and
    a processor coupled to the memory and the processor configured to
        acquire the first image and the second image,
        detect a line of sight of the user based on the second image,
        identify objects from the first image in accordance with the detected line of sight of the user, and
        perform control of at least one of photographing direction of the first camera and photographing magnification of the first camera such that all of the identified objects is continuously included in a photographing range of the first camera for a first time period or longer,
    wherein the control includes controlling the photographing direction of the first camera such that a center of the photographing range of the first camera is positioned within a first distance from a standard position of a range including all of the objects,
    wherein the processor is configured to determine weight levels to the objects such that the weight levels are reduced as time that elapses after the objects are identified become longer, and
    wherein the processor is configured to determine the standard position in accordance with the weight levels.

2. The photographing control apparatus according to claim 1, wherein the objects are identified in accordance with a region in which the line of sight of the user remains for a second time period or longer.

3. The photographing control apparatus according to claim 1,
wherein, when a first object of the identified objects moves into an area included on the first image, the processor is configured to switch from the first camera to a third camera to photograph the first object continuously, and
wherein a photographing range of the third camera is adjacent to the photographing range of the first camera.

4. The photographing control apparatus according to claim 1,
wherein the processor is configured to extract one or more objects included in the first image and determine whether each of motions of the extracted one or more objects corresponds to a specific motion defined as an abnormality, and
wherein when the processor determines that a first motion of a first object corresponds to the specific motion, the processor is configured to notify the user of the first motion of the first object.

5. The photographing control apparatus according to claim 1,
wherein the processor is configured to extract one or more objects included in the first image and identify, from the extracted one or more objects, a first object in accordance with whether each of the extracted one or more objects has a specific feature.

6. A photographing control apparatus comprising:
a memory configured to store a first image that is photographed by a first camera and a second image that is photographed by a second camera, the second image including an image of a user who has visibility of the first image displayed in a display device; and
a processor coupled to the memory and the processor configured to
acquire the first image and the second image,
detect a line of sight of the user based on the second image,
identify objects from the first image in accordance with the detected line of sight of the user, and
perform control of at least one of photographing direction of the first camera and photographing magnification of the first camera such that all of the identified objects is continuously included in a photographing range of the first camera for a first time period or longer,
wherein the control includes controlling the photographing direction of the first camera such that a center of the photographing range of the first camera is positioned within a first distance from a standard position of a range including all of the objects,
wherein the processor is configured to measure cumulative time periods for which the line of sight of the user remains on images of the identified objects, and the processor is configured to determine weight levels to the objects such that the weight levels are increased as the cumulative time periods become longer, and
wherein the processor is configured to determine the standard position in accordance with the weight levels.

7. A computer-implemented photographing control method comprising:
acquiring a first image photographed by a first camera and a second image photographed by a second camera, the second image including an image of a user who looks at the first image displayed in a display device;
detecting the line of sight of the user based on the second image;
identifying objects from the first image in accordance with the detected line of sight of the user; and
controlling at least one of photographing direction of the first camera and photographing magnification of the first camera such that all of the identified objects is continuously included in a photographing range of the first camera for a first time period or longer,
wherein the controlling includes controlling the photographing direction of the first camera such that a center of the photographing range of the first camera is positioned within a first distance from a standard position of a range including all of the objects,
wherein determining weight levels to the objects such that the weight levels are reduced as time that elapses after the objects are identified become longer; and
determining the standard position in accordance with the weight levels.

8. The photographing control method according to claim 7,
wherein the objects are identified in accordance with a region in which the line of sight of the user remains for a second time period or longer.

9. The photographing control method according to claim 7, further comprising:
measuring cumulative time periods for which the line of sight of the user remains on images of the identified objects, and the processor is configured to determine weight levels to the objects such that the weight levels are increased as the cumulative time periods become longer; and
determining the standard position in accordance with the weight levels.

10. The photographing control method according to claim 7, further comprising:
when a first object of the identified objects moves into an area included on the first image, switching from the first camera to a third camera to photograph the first object continuously, wherein a photographing range of the third camera is adjacent to the photographing range of the first camera.

11. The photographing control method according to claim 7, further comprising:
extracting one or more objects included in the first image and determining whether each of motions of the extracted one or more objects corresponds to a specific motion defined as an abnormality; and
when it is determined that a first motion of a first object corresponds to the specific motion, notifying the user of the first motion of the first object.

12. The photographing control method according to claim 7, further comprising:
extracting one or more objects included in the first image and identifying, from the extracted one or more objects, a first object in accordance with whether each of the extracted one or more objects has a specific feature.

* * * * *